June 9, 1942.  B. M. SHIPLEY  2,286,116
CASH REGISTER
Filed Feb. 18, 1938  12 Sheets-Sheet 1

Inventor
Bernis M. Shipley
By
Earl Berot
His Attorney

June 9, 1942.  B. M. SHIPLEY  2,286,116
CASH REGISTER
Filed Feb. 18, 1938    12 Sheets-Sheet 2
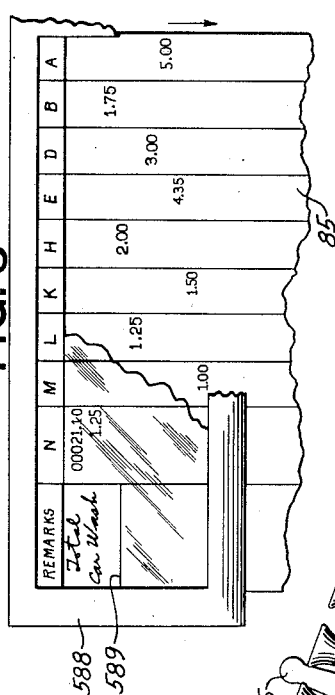
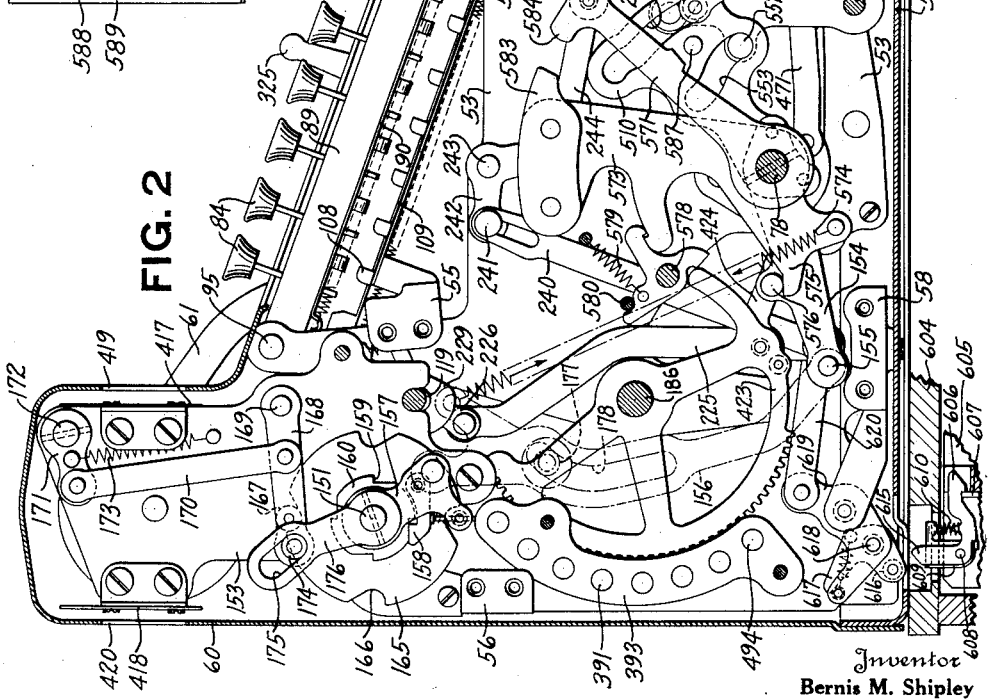
Inventor
Bernis M. Shipley
By
Earl Berst
His Attorney June 9, 1942. B. M. SHIPLEY 2,286,116
CASH REGISTER
Filed Feb. 18, 1938 12 Sheets-Sheet 3
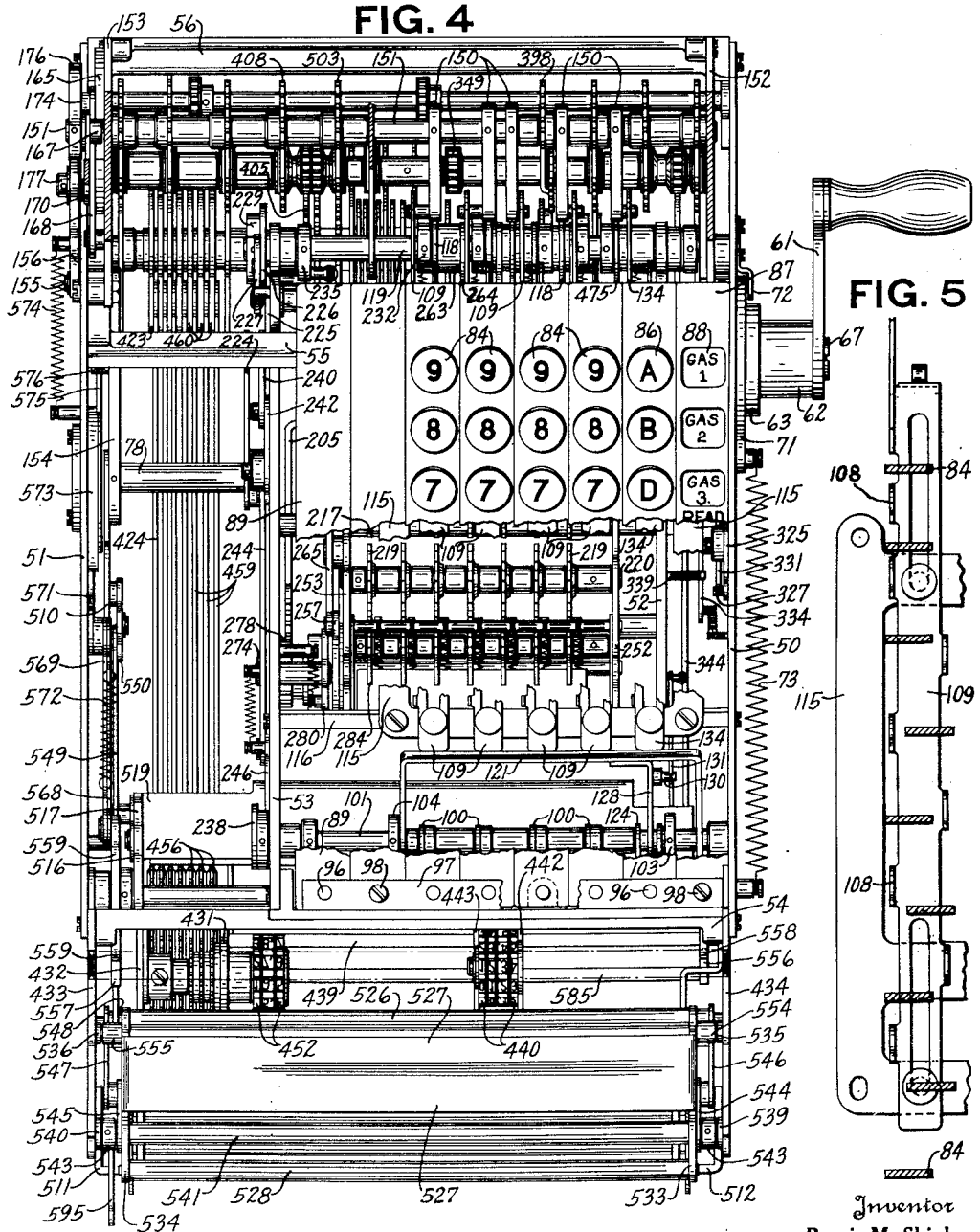
Inventor
Bernis M. Shipley
By
Carl Beust
His Attorney June 9, 1942.　　B. M. SHIPLEY　　2,286,116
CASH REGISTER
Filed Feb. 18, 1938　　12 Sheets—Sheet 4

Inventor
Bernis M. Shipley
By
Earl Benst
His Attorney

June 9, 1942.   B. M. SHIPLEY   2,286,116
CASH REGISTER
Filed Feb. 18, 1938   12 Sheets-Sheet 5

Inventor
Bernis M. Shipley
By
Pearl Beust
His Attorney

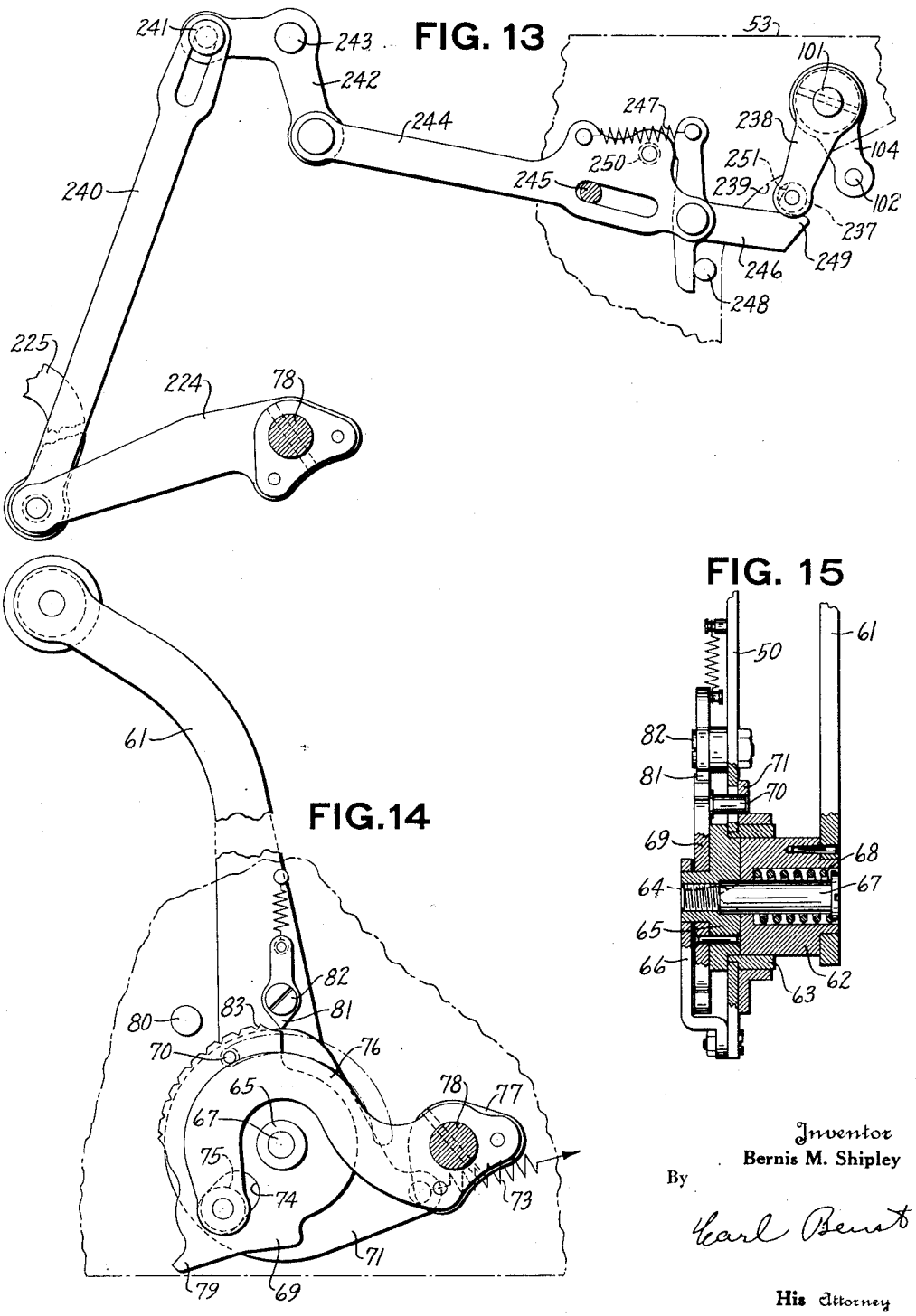

June 9, 1942.  B. M. SHIPLEY  2,286,116
CASH REGISTER
Filed Feb. 18, 1938    12 Sheets-Sheet 7

Inventor
Bernis M. Shipley
By
Earl Berst
His Attorney

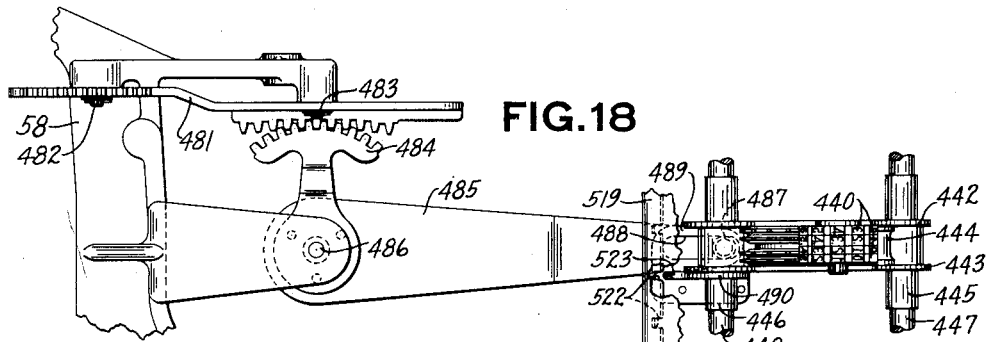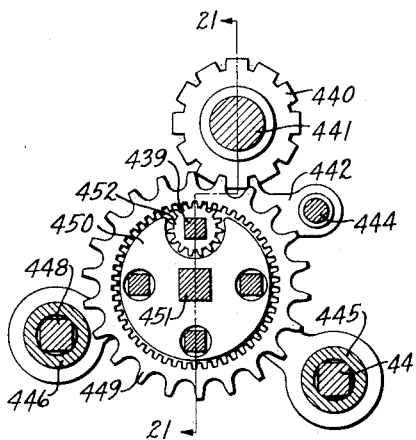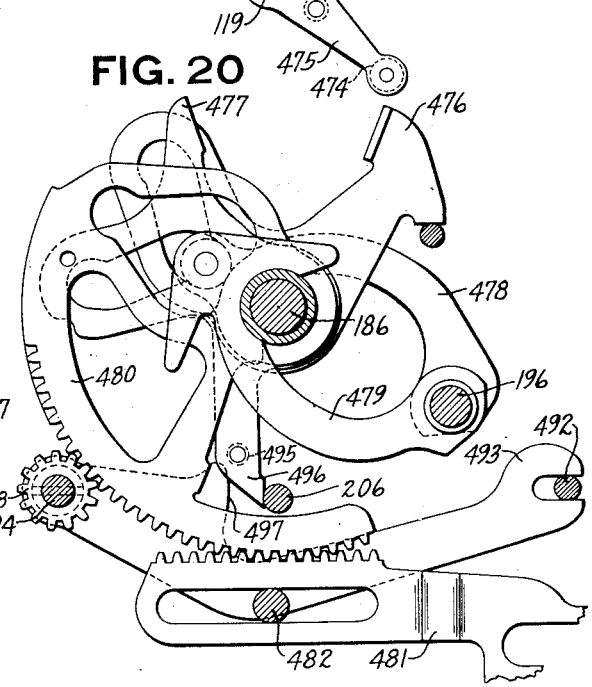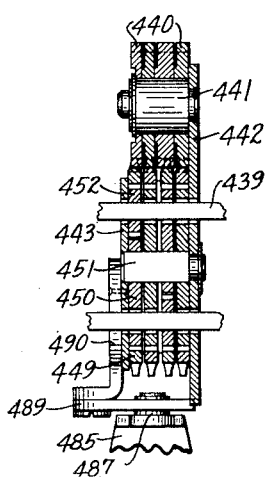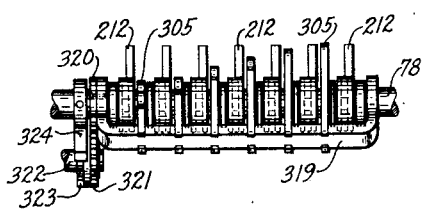

June 9, 1942.  B. M. SHIPLEY  2,286,116
CASH REGISTER
Filed Feb. 18, 1938    12 Sheets-Sheet 9

Inventor
Bernis M. Shipley
By
Cecil Benst
His Attorney

June 9, 1942.　　　　B. M. SHIPLEY　　　　2,286,116
CASH REGISTER
Filed Feb. 18, 1938　　　　12 Sheets-Sheet 10
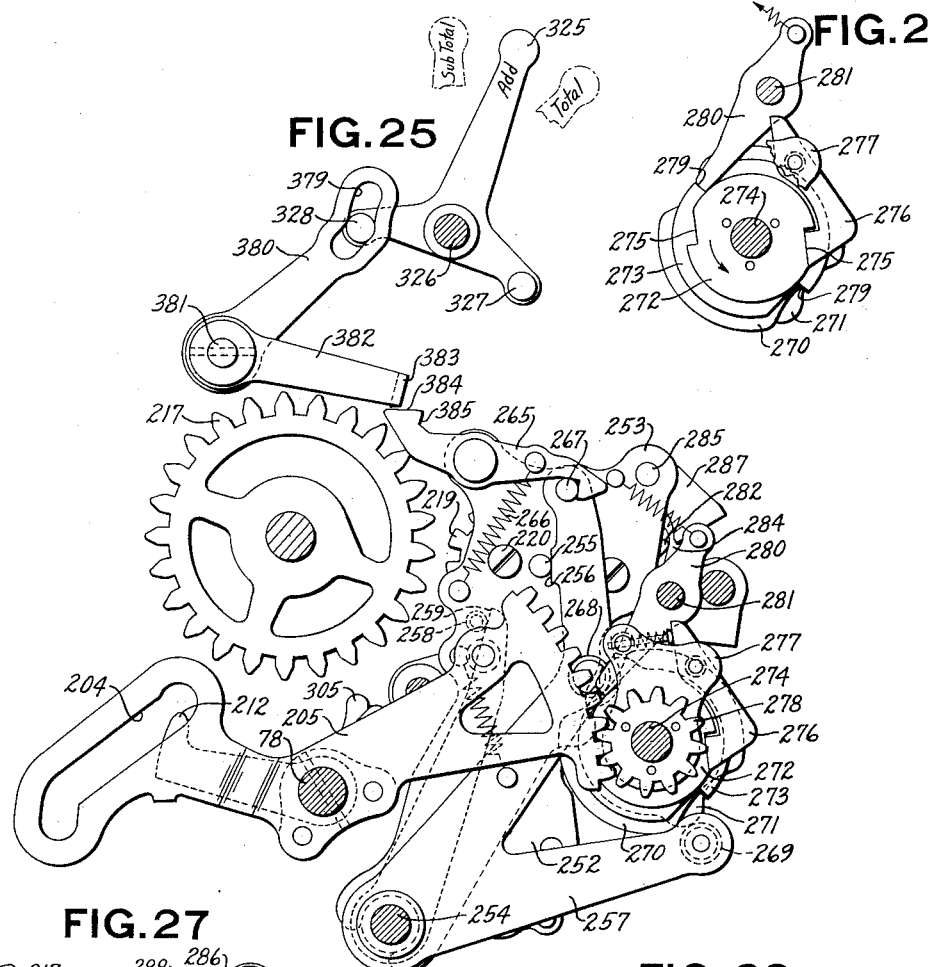
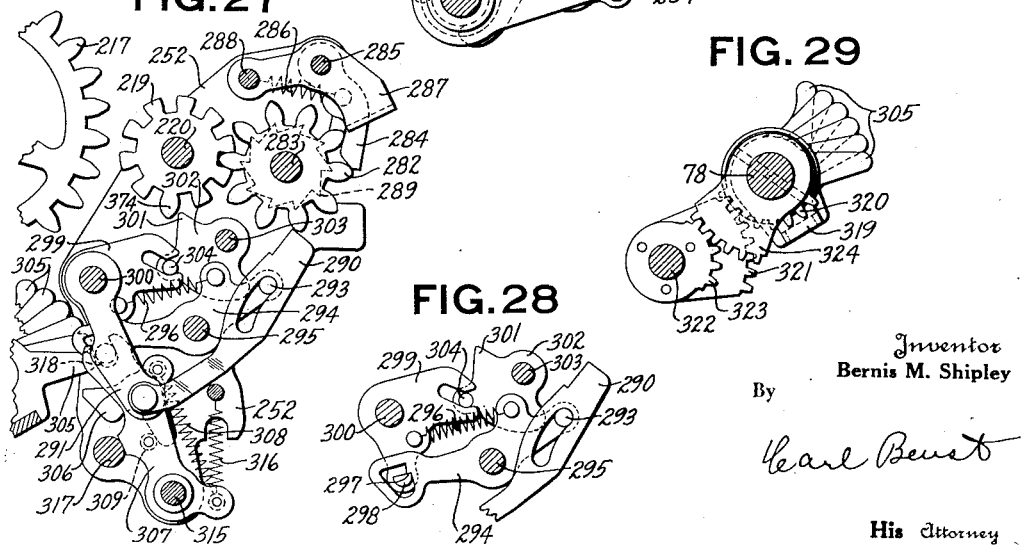
Inventor
Bernis M. Shipley
By
Earl Benst
His Attorney June 9, 1942.  B. M. SHIPLEY  2,286,116
CASH REGISTER
Filed Feb. 18, 1938  12 Sheets-Sheet 11
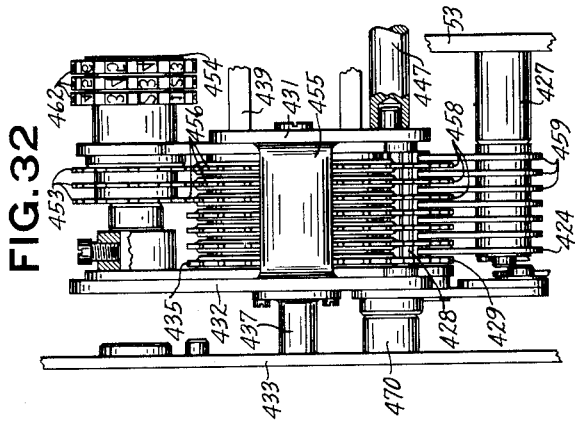
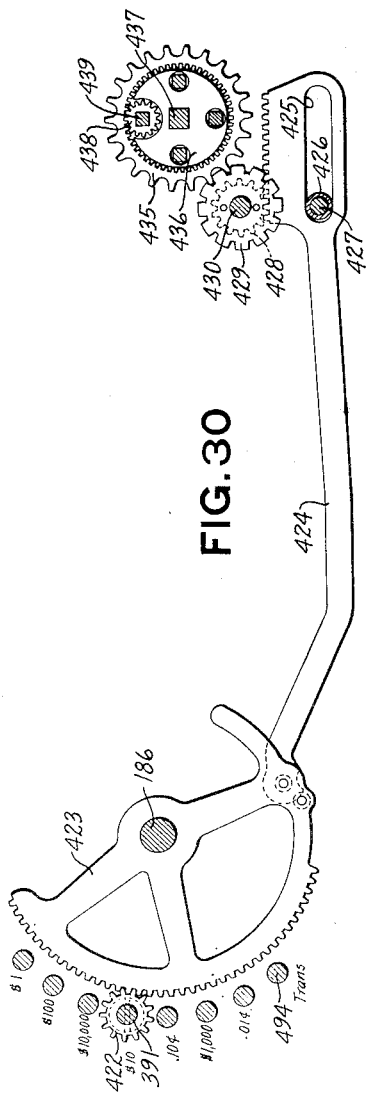
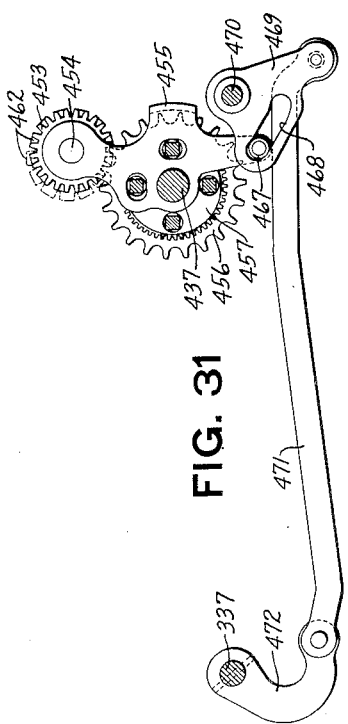
Inventor
Bernis M. Shipley
By
His Attorney June 9, 1942.    B. M. SHIPLEY    2,286,116
CASH REGISTER
Filed Feb. 18, 1938    12 Sheets-Sheet 12
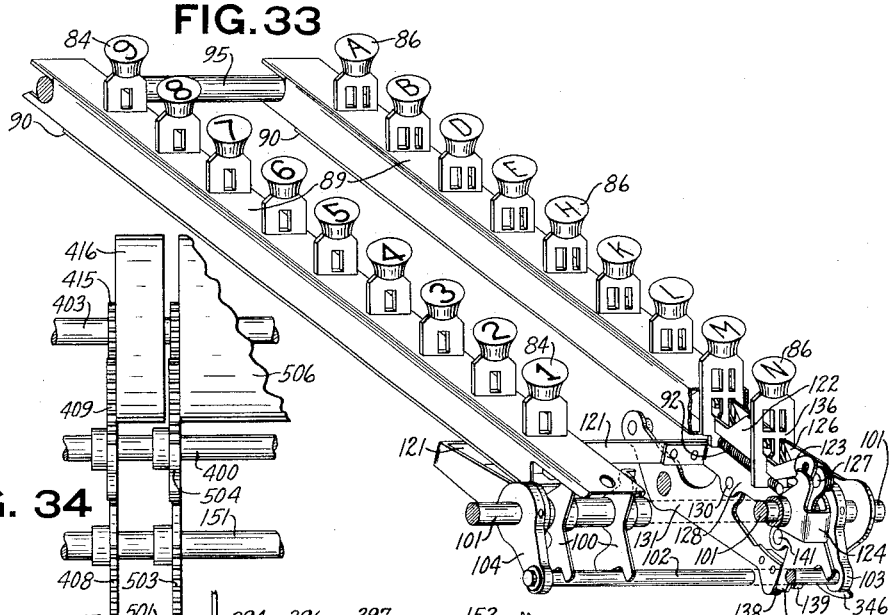
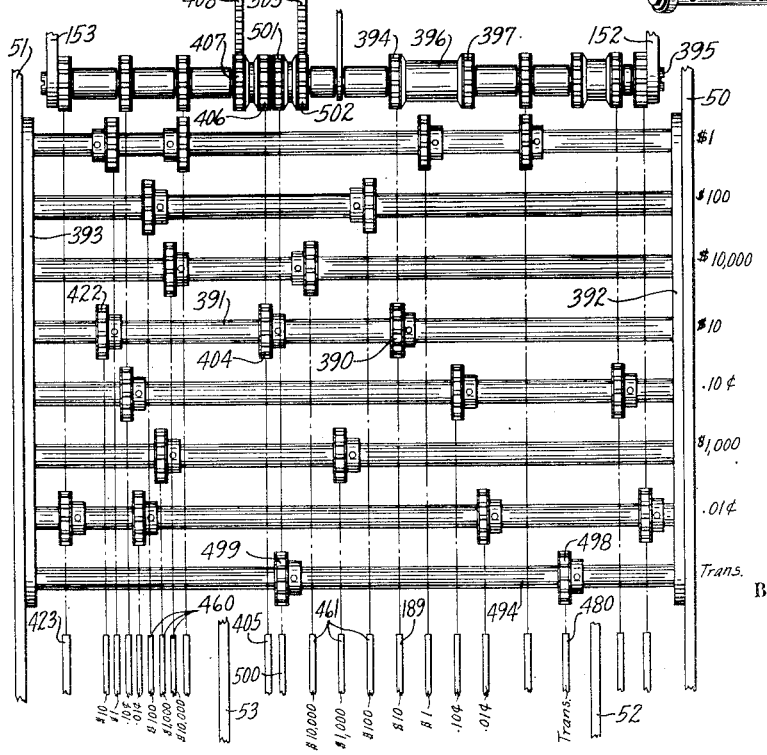
Inventor
Bernis M. Shipley
By
Carl Bent
His Attorney Patented June 9, 1942

2,286,116

UNITED STATES PATENT OFFICE 2,286,116

CASH REGISTER

Bernis M. Shipley, Dayton, Ohio, assignor to The National Cash Register Company, Dayton, Ohio, a corporation of Maryland Application February 18, 1938, Serial No. 191,169

18 Claims. (Cl. 235—2)

The following invention is directed to small, compact, and efficient cash registers, for use in filling stations, drug stores, chain stores, and analogous businesses, and particularly to that class of cash registers embodying the type of differential mechanism disclosed in Shipley Patents Nos. 2,048,083, granted July 21, 1936, 1,804,650 granted May 12, 1931, and 2,031,860 granted February 25, 1936, and to machines embodying the internal-external gear mechanism disclosed in U. S. Patent No. 1,693,279, issued November 27, 1928, to Walter J. Kreider.

The main object of this invention is the provision of a small, compact, efficient, readily portable, and easily operable cash register, for use in filling stations, drug stores, chain stores and analogous businesses.

Another object is to provide a register, having the above characteristics, with a selectively shiftable type carrier unit for printing in the various columns of a record strip.

Still another object is to furnish novel means for adjusting the differential control members.

A further object is to provide means to differentially position the type carriers in proportion to the amount set up on the amount keys and to simultaneously shift said type carriers, to position them in relation to the different columns of the record material.

Another object is the provision of means for shifting the record material from reading position to printing position.

Another object is to supply novel compensating means to automatically control the tension of the impression means.

Further objects of the present invention are, to provide novel means for preventing the overflow type wheels from printing in adding operations, to supply an improved impression operating mechanism, to provide novel means for controlling the machine in total and sub-total operations, and the provision of various interlocks between the different mechanisms of the machine.

With these and incidental objects in view, the invention includes certain novel features of construction and combinations of parts, the essential elements of which are set forth in appended claims, and a preferred form or embodiment of which is hereinafter described with reference to the drawings which accompany and form a part of this specification.

In the drawings:

Fig. 2 is an elevation of the left side of the machine, with the left side frame removed, showing in particular the impression mechanism.

Fig. 3 is a facsimile of a fragmentary portion of the record strip and the closure through which said record strip is accessible.

Fig. 4 is a top plan view of the machine, with the cabinet and the indication removed, and a portion of the keyboard broken away.

Fig. 5 is a detail view of one of the amount control slides, showing the relation of the stopping lugs thereon to the various keys of the amount bank associated therewith.

Fig. 13 is a detail view of the mechanism for releasing the depressed keys near the end of machine operation.

Fig. 14 is a left side elevation of the operating handle.

Fig. 15 is a fragmentary sectional view of the operating handle or lever.

Fig. 18 is a top plan view of a portion of the mechanism for moving the amount type carriers to various columnar positions.

Fig. 19 is a detail view of the internal-external gear mechanism for positioning the type wheels.

Fig. 20 is a detail view showing the transaction differential mechanism and how it is connected to the mechanism illustrated in Fig. 18.

Fig. 21 is a sectional view taken along line 21—21, Fig. 19, showing the type wheel assembly for printing in the various columns of the record material.

Fig. 22 is a front view of a portion of the main operating shaft, showing the operating fingers for the transfer mechanism.

Fig. 25 is a left side elevation of the totalizer engaging mechanism and the mechanism for controlling the totalizer engaging mechanism in sub-total operations.

Fig. 26 is a detail view of the totalizer engaging cams and a portion of the mechanism for driving said cams.

Fig. 27 illustrates the mechanism for transferring amounts from lower to higher denominations.

Fig. 28 is a detail view of a portion of the transfer mechanism.

Fig. 29 is an end view of the transfer operating fingers and the mechanism for driving said fingers.

Fig. 30 illustrates the connection between one of the amount differentials and the type wheel associated therewith.

Fig. 31 illustrates the mechanism for rocking the higher order type wheels to printing position, in total and sub-total operations.

Fig. 32 is a front view of the type wheel driving mechanism.

Fig. 33 is a perspective view of the transaction or control bank and one of the amount banks, and the controlling mechanism associated therewith.

Fig. 34 is a diagrammatic view as observed from the front of the machine, illustrating the pinion lines which connect the amount and transaction differential mechanisms to the indicators and type wheels associated therewith.

General Description

Figure 1:
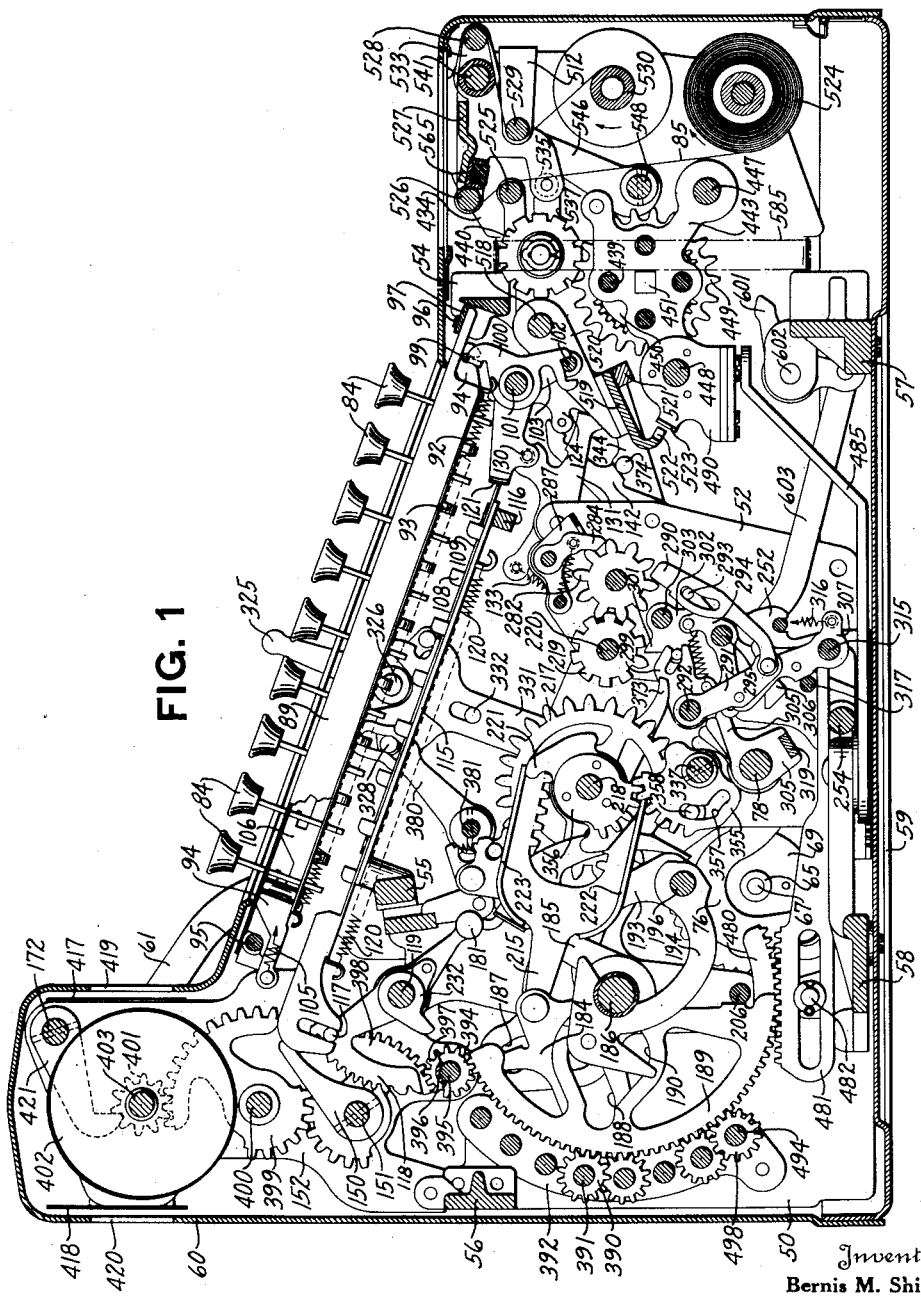
Fig. 1 is a longitudinal sectional view, as observed from the left of the machine, taken just to the right of the ten dollar amount bank.

The machine chosen to illustrate the present invention is enclosed in a cabinet, the outlines of which are shown in United States Patent No. Des. 81,411, issued to Bernis M. Shipley on June 17, 1930, and is provided with four amount banks, which in cooperation with their associated differential mechanisms position their corresponding indicators and type wheels to indicate and print the amount set up thereon, and also cause said amount to be added in the corresponding wheels of a totalizer unit.

The type wheels, associated with the various amount banks, are mounted in a slidable framework, which is positionable in relation to the various columnar divisions which are ruled on the record strip, thereby providing a simple and efficient column printing cash register having many novel features.

Depressing any one of the amount keys moves the lower end of the stem thereof into the path of a corresponding projection on a corresponding spring-pulled slide, which is connected to a corresponding differential control lever. The amount slides are retained in normal position by a bail, which is rocked to ineffective position by the depression of any one of a series of transaction or column selecting keys. This releases the amount slides to the action of their springs, which position said slides and their associated control levers, in accordance with the depressed amount keys. Depression of any one of the transaction keys also locks the depressed amount keys against release and the undepressed amount keys against depression, and likewise locks the transaction keys against release or depression. Moreover, depression of any one of the transaction keys also unlocks the operating lever to permit operation of the machine.

Upon operation of the machine, the differential control levers position corresponding differentials in accordance with the depressed amount keys and the differentials in turn position corresponding indicators and type wheels to indicate and print the amounts set up on the amount keys.

As previously stated, the type wheels for the amount banks are mounted in a movable frame, which is selectively positioned by the differential mechanism for the transaction keys, to print in a column of the record material corresponding to the depressed transaction key. The amount differentials, in cooperation with corresponding totalizer wheels, add in said totalizer wheels the amounts set up on the keyboard.

In addition to the four amount banks, the present machine is equipped with three overflow banks, having corresponding differential mechanisms, type wheels and totalizer wheels, for increasing the accumulating capacity of the register. The type wheels for the three overflow banks function only in total and sub-total operations, and inasmuch as totals and sub-totals are always printed in a particular column of the record sheet, it is unnecessary to have these type wheels mounted in the movable frame with the type wheels for the amount banks. In total and sub-total operations the type wheels for the amount banks are always moved adjacent the type wheels for the three overflow banks, and in cooperation therewith, print the total or the sub-total of the amount contained in the totalizer in a particular column of the record sheet.

A manipulative lever is provided for conditioning the machine for total and sub-total operations. Moving the manipulative lever to either total or sub-total position locks the transaction keys against depression and retains the differential control slides and levers in a neutral position. Moving the total control lever to either total or sub-total position also renders mechanism effective that causes the totalizer wheels to be reversely rotated, and while being reversely rotated a long tooth on each of said totalizer wheels, corresponding to the zero position thereof, in cooperation with associated stop mechanism, stops said totalizer wheels in zero position. This zeroizes the totalizer and simultaneously sets the type wheels to the amount standing on said totalizer. In total operations the wheels of the totalizer are disengaged from the totalizer actuators while standing at zero, and in sub-total operations the totalizer wheels remain in engagement with the totalizer actuators and are restored thereby to their original positions. Moving the total control lever to either total or sub-total position also unlocks the machine so that it may be operated without the depression of a transaction key.

As previously explained, the record material is ruled off in columnar divisions, there being a column for each transaction or control key, and one of such columns being used for printing totals and sub-totals. The record material is threaded around a shiftable framework which supports the impression block, and a portion of which forms a table for writing various data in a column of the record material reserved for that purpose.

When the machine is at rest the last few entries on the record strip are visible through transparent material, covering an opening in the top of a closure for the cabinet, and the column of the record strip reserved for writing down data is accessible through an opening in said transparent material. Upon operation of the machine the shiftable impression frame-work moves the record strip from reading position to printing position and simultaneously becomes engaged with the impression operating mechanism, whereupon operation of the printing hammer, at the proper time, rocks the impression framework, to imprint the amount set up on the keyboard, or the total contained in the totalizer, in the appropriate columns of the record material. After printing is completed, the shiftable impression framework is moved to reading position where the last entry and several of the preceding entries are visible through the opening in the cabinet closure.

The single impression block is necessarily quite long, in order to cover all the columns of the record material, thereby necessitating the development of a novel, yieldable, tension device for maintaining uniform printing pressure between the impression block and the type wheels.

The mechanism outlined in general above will now be described in detail.

Detailed Description

Framework

Directing attention to Figs. 1, 2 and 4, the main framework of the machine comprises a right frame 50, a left frame 51, and auxiliary frames 52 and 53, held in fixed relation to each other by tie bars 54, 55 and 56, and cross frames 57 and 58. The cross frames 57 and 58 are in turn secured to a machine base 59, and the mechanism of the machine is enclosed in a suitable case or cabinet 60 which is also secured to the machine base 59. The machine base 59 is secured to the top of a suitable drawer cabinet 604 (Fig. 2) having a single cash drawer 605, later to be described.

Operating mechanism

The present machine is provided with a manipulative lever 61 (Figs. 1, 2, 4, 14 and 15), similar to that used on adding machines, for operating the machine mechanism. However, power operating means may be easily installed in place of the lever 61, if desired.

Integral with the lever 61 (Figs. 4 and 15) is a hub 62, which fits in the bore of a bushing 63, secured in the frame 50. The hub 62 has angular tenons 64 which fit corresponding clutch cuts in a hub 65, one diameter of which fits in the bushing 63 and a smaller diameter of which fits freely in a hole in a bracket 66 secured to the frame 50. A screw stud 67, which threads into the hub 65, compresses a spring 68 in a boring in the hub 62, said spring and said screw stud, together, forming a non-rigid coupling between the hubs 62 and 65. When for any reason the machine mechanism fails to function, applying excessive pull to the lever 61 causes the tenon 64 to ride out of its angular clutch cut, further compressing the spring 68, thereby preventing damage to the mechanism of the machine.

Integral with the hub 65 (Figs. 14 and 15) is a disc 69 carrying a stud 70, which extends through a clearance slot in the frame 50 concentric with the bushing 63. The stud 70 engages one of a series of holes in a collar 71, turnably supported by the bushing 63, and retained in position against the outside surface of the frame 50 by the bent-over portion of a retaining plate 72 (Fig. 4) secured to the frame 50. A comparatively strong spring 73, tensioned between a stud in the collar 71 and a stationary stud in the frame 50, is provided for returning the lever 61 from operated position to normal position, to complete operation of the machine.

Pulling the lever 61 clockwise or to the right, as viewed in Fig. 14, causes a radial slot 74 in the disc 69, in cooperation with a roller 75 on one end of a lever 76 secured to a plate 77 in turn secured on a main drive shaft 78 journaled in the frames 50, 51, 52 and 53 (Fig. 4), to rock said lever 76 and said shaft 78 clockwise. Clockwise movement of the shaft 78 is terminated by a projecting finger 79, on the disc 69, contacting a stationary stud 80 in the frame 50. This tensions the spring 73, which upon release of the lever 61, returns said lever and the shaft 78 counter-clockwise to normal positions, as shown in Fig. 14. A complete oscillation of the main shaft 78, as just described, causes the machine to operate through a complete cycle.

A tooth of a full-stroke pawl 81 (Figs. 14 and 15), fulcrumed on a stud 82 in the frame 50, in cooperation with a series of equally spaced V notches 83, in the periphery of the disc 79, enforces full movement of the handle 61 and the shaft 78, in either direction to prevent mal-operation of the machine.

Keyboard

The keyboard of the machine embodying the present invention includes four rows of amount keys 84, (Figs. 1, 2 and 4) which are used for the setting up of amounts to be displayed by the indicators, printed in one of a plurality of columns of a record strip 85, (Fig. 3), and entered in the totalizer. The keyboard also includes a row of nine transaction or column selecting keys 86 (Figs. 4 and 33), depression of any one of which locks depressed amount keys and transaction keys against release and locks undepressed amount and transaction keys against depression, causes the differential control mechanism to be positioned by the depressed amount keys, unlocks the machine operating mechanism, and during machine operation, causes the type wheels for the four rows of amount keys 84 to be moved opposite a column on the record strip 85, corresponding to the depressed transaction key 86. The transaction keys 86 also position front and back indicators to visibly display the type of transaction being performed.

To the right of the row of transaction keys 86 (Fig. 4) is a frame 87, similar to the amount and transaction key frames, which has an opening 88 opposite each transaction key 86. Through the transparent covering of the openings 88 there is visible an index for each corresponding key. For example, keys A, B and D, (Fig. 4), represent respectively, three grades of gasoline, indicated by Gas 1, Gas 2 and Gas 3, visible through the openings 88.

The amount and transaction key frames comprise an inverted U-shaped frame 89 (Figs. 1, 2, 7 and 33) having a bottom cover 90, secured thereto by a plurality of screws threaded into a plurality of studs, depending from the top of the frame 89. The keys 84 and 86 fit in corresponding slots in the top of the frame 89 and the cover plate 90. The lower ends of the keys 84 and 86 have therein an open slot 91 which engages a long coil spring 92, opposite ends of which are connected to hook-shaped projections on the plate 90 (Fig. 1), and a plurality of fingers 93 formed out of the plate 90 further support the spring 92 between each of the keys 84 and 86. The amount keys 84 (Figs. 1, 6 and 7) are retained assembled in the framework of the key bank by a locking detent 94, which passes through vertical slots in said amount keys.

The amount and transaction key banks are easily assembled or removed from the machine. In assembling the key banks in the machine, slipped over a rod 95, (Figs. 1, 2 and 33) supported by the frames 50 and 53, the wall of one of said notches fitting in an annular groove in said rod to side space the key banks. Next, holes, in the lower ends of the frames 89, are slipped over studs 96 in projections of the tie bar 54. The key banks are then secured in place by a plate 97, which fits over the lower end of the key frames and the studs 96, said plate being anchored by screw studs 98 threaded in the tie bar 54.

The locking detents 94 (Figs. 1 and 12), for the amount banks, have hooks on the forward ends thereof which engage bent-over ears 99 of arms 100, free on a shaft 101, journaled in the frames 50 and 53 (Fig. 4). The lower ends of the arms 100 (Figs. 1 and 12) have notches, which straddle a rod 102 supported by arms 103 and 104 secured on the shaft 101. A spring 105 (Figs. 1 and 6) tensioned between each of the detents 94 and its respective frame urges said detents forwardly to normally maintain the right-hand wall of the notches in the arms 100 (Fig. 1) in contact with the rod 102, to position hook-shaped projections 106, (Figs. 6 and 7) of said detents, in proper relation to webs or bridges 107, which span the vertical slots in the amount keys 84.

Depressing an amount key 84 (Fig. 6) causes the web 107, in cooperation with the angular nose of the corresponding hook 106, to shift the detent 94 rearwardly against the action of the spring 105. When the web 107 passes beneath the hook 106 the spring 105 returns the detent 94 forwardly to retain said key depressed. The amount keys are so-called flexible keys in that depressing an amount key in an amount key bank releases a previously depressed amount key in the same bank.

*Differential control mechanism*

Depressing one of the amount keys 84 (Figs. 1, 5 and 6) moves the lower end of the stem thereof into the path of a corresponding projection 108 on a differential control slide 109, slidably mounted on a plate 115 secured to the tie bar 55 and a bar 116 extending between the frames 50 and 53 (Fig. 4). There is a slide 109 and associated mechanism for each amount bank.

Fig. 5 illustrates the relation of the ten dollar amount keys 84 to their corresponding projections 108. The upper end of the slide 109 (see also Fig. 6) has a slot therein which engages a stud 117 in a segmental portion of its differential control lever 118, free on a shaft 119, journaled in the frames 52 and 53 (Fig. 4). A spring 120 (Figs. 1, 6, 10 and 12), tensioned between the slide 109 and the plate 115, urges said slide forwardly and the lever 118 clockwise to normally maintain a projecting end of said slide in contact with an arcuate bail of a yoke 121, the arms of which are free on the shaft 101.

Figure 10:
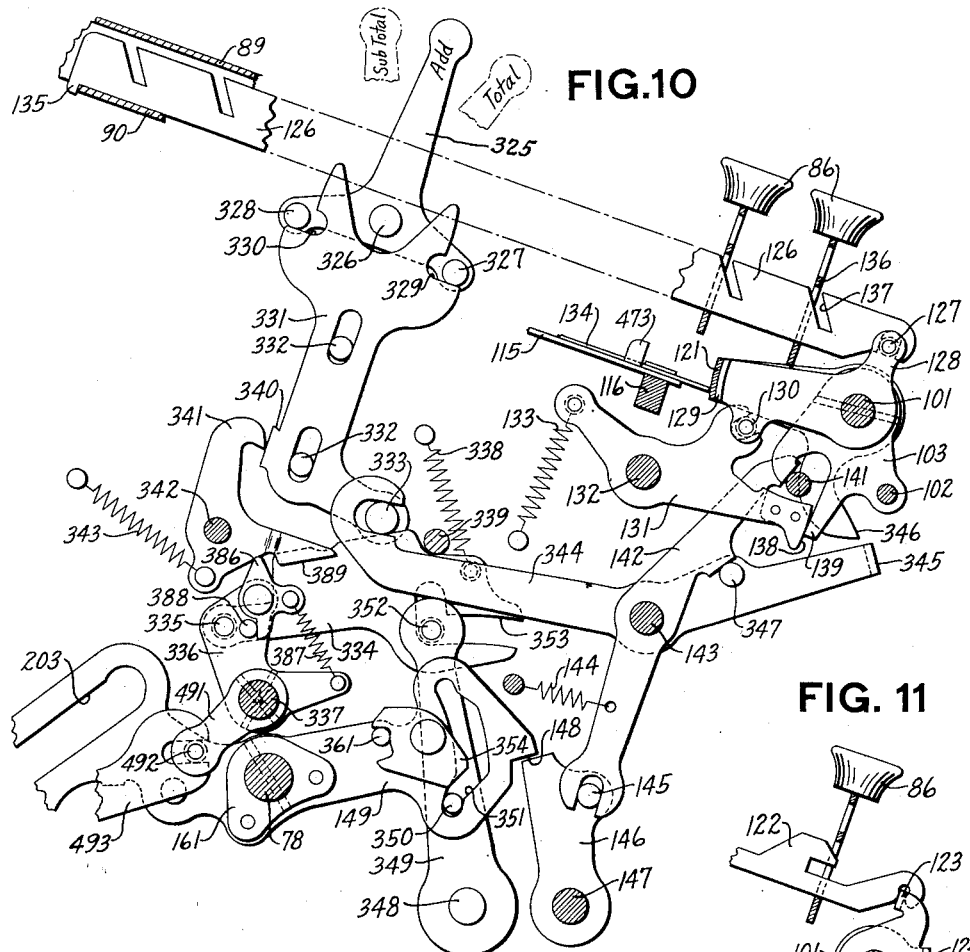
Fig. 10 is a side elevation of the total control lever and associated mechanism, the interlock between the amount keys, the transaction keys and the total control lever, and the interlocks between the total control lever, the control keys, and the machine operating mechanism.
Figure 11:
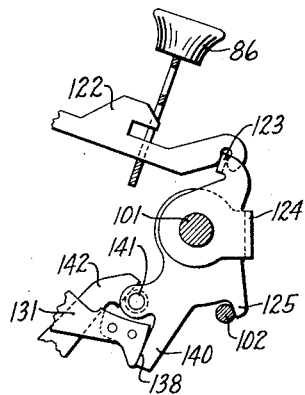
Fig. 11 is a detail view of the mechanism for locking the transaction or control keys during machine operations.
Figure 12:
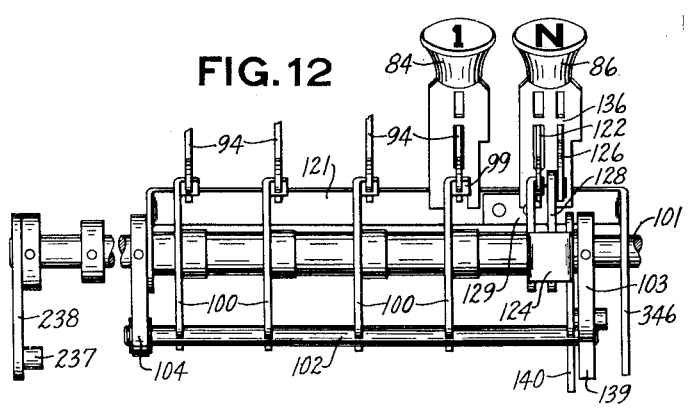
Fig. 12 is a front view, illustrating the locking detents for the various amount banks and the transaction bank, and the control mechanism associated with the transaction bank.

Referring to Figs. 11, 12, and 33, the bank of transaction keys 86 has a locking detent 122, which is like the amount detent 94 (Fig. 6) in construction and assembly. The hook-shaped forward end of the detent 122 engages a bent-over ear 123 of one arm of a yoke 124, free on the shaft 101, and a spring (not shown) urges the detent 122 forwardly and the yoke 124 clockwise to maintain a projection 125, of said yoke, in contact with the rod 102. The bank of transaction keys 86 also has a control plate 126 (Figs. 10, 12 and 33) which extends through slots in said transaction keys in exactly the same manner as the locking detent, and a notch in the forward end of said plate 126 embraces a stud 127 in an extension of an arm 128 free on the shaft 101, and having a bent-over portion 129 secured to the bail of the yoke 121. Another extension of the arm 128 carries a stud 130 embraced by a bifurcated extension of an arm 131 free on a stud 132 in the frame 52. A spring 133 urges the arm 131 counter-clockwise, the arm 128 and the yoke 121 clockwise, to maintain the bail of said yoke 121 in the path of the amount control slides 109 (Fig. 4), and in the path of a transaction control slide 134; the latter mounted in exactly the same manner as the amount slides 109. The arm 128 tends to shift the control plate 126 forwardly and the positions of these connected parts are determined, when the machine is at rest, by a projection 135 on the rearward end of the control plate 126, in cooperation with the cover plate 90 for the transaction bank 89.

Depressing one of the transaction keys 86 (Figs. 10 and 33) causes a web or bridge 136 on the key 86, extending across the slot for the control plate 126, in cooperation with a corresponding angular slot 137 in said plate 126, to shift said plate rearwardly. Rearward movement of the plate 126 rocks the arm 128 and the bail 121 counter-clockwise to move said bail beneath the ends of the amount and transaction slides 109 and 134, thereby releasing said slides to the action of their respective springs. Counter-clockwise movement of the arm 128 rocks the arm 131 clockwise to move an arcuate surface 138 on an extension thereof beyond a depending finger 139 of the arm 103, to release said arm, the rod 102, and the arm 104 (Figs. 1 and 12) so that the rod 102 will no longer obstruct clockwise movement of the arms 100, whereupon the springs 105 shift the locking detents 94, for the amount banks, forwardly to lock the depressed amount keys against releasing and to lock the undepressed amount keys against depression.

Continued clockwise movement of the arm 131 causes the surface 138 to move beyond a finger 140 (Figs. 11 and 12) on an arm of the yoke 124, said finger being slightly longer than the finger 139. This permits the locking detent 122, for the transaction keys, to be moved forwardly under influence of its spring to lock said keys against release or depression. The finger 140 being slightly longer than the finger 139 prevents the transaction keys from being locked until after the amount keys are locked.

Clockwise movement of the yoke 124, under the influence of the spring for the detent 122, causes a stud 141, in an extension of said yoke, in cooperation with the upper end of a lever 142, free on a stud 143 (Figs. 10 and 11) in the frame 52, to rock said lever counter-clockwise against the action of a spring 144. Counter-clockwise movement of the lever 142 causes a slot therein, coacting with a stud 145 in an arm 146 free on a stud 147 in the frame 52, to rock said arm 146 clockwise to move the upper end thereof from beneath a shoulder 148 on an arm 149 integral with a plate 161 secured to the main shaft 78. This frees the main shaft 78 for oscillation so that the machine may be operated.

Figure 8:
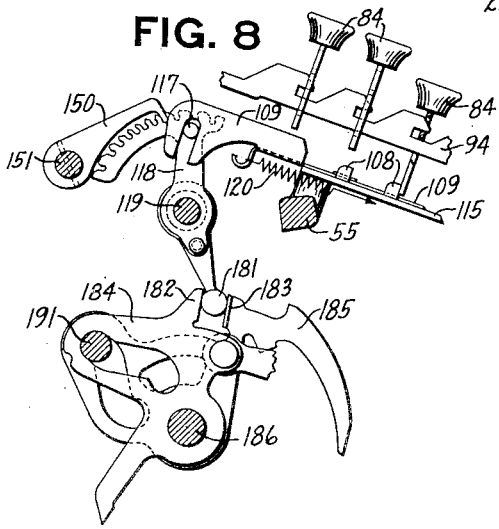
Fig. 8 is a detail view illustrating how the keys of Fig. 6 position the differential mechanism associated therewith.

Moving the bail 121 (Fig. 1) to ineffective position, by depressing a transaction key 86, permits the springs 120 (Figs. 5, 6 and 8) to move the amount slides 109 forwardly until the corresponding projections 108 on said slides engage the stems of the depressed amount keys. Fig. 8 shows the positioning of the slide 109 and lever 118, for the $10.00 bank, by the "seven" key. This positions the slides 109 and the corresponding levers 118 in proportion to the depressed amount keys, whereupon operation of the machine causes corresponding aliners 150 to engage the proper one of a series of tooth spaces in segmental portions of the levers 118 to retain said levers in set positions. The aliners 150 are secured on a shaft 151 journaled in indicator frames 152 and 153 (Figs. 1, 2 and 4) secured to the tie bar 56 and the frames 50 and 51 by a plurality of screw studs, the removal of which permits the indicator assembly to be removed in a unit.

The shaft 151 is driven in the following manner: Fast on the main drive shaft 78 (Fig. 2) is an arm 154 carrying a stud 155 which extends through a clearance slot in the frame 52 and engages the lower end of a link 156, shown in dot and dash lines, the upper end of which is pivotally connected to an arm 157 free on the shaft 151. The arm 157 carries a spring pushed pawl 158 adapted to cooperate with four equally spaced notches 159 in a ratchet 160 integral with a disc 165 free on the shaft 151. The disc 165 has four equally spaced camming notches 166, which cooperate with a roller 167 on an arm 168, free on a stud 169 in the frame 153. The arm 168 is connected by a link 170 to a crank 171 fast on the left-hand end of an indicator aliner shaft 172, journaled in the frames 152 and 153. A spring 173, tensioned between the crank 171 and the frame 153, urges the arm 168 counter-clockwise to normally maintain the roller 167 in engagement with one of the notches 166 when the machine is at rest.

Figure 6:
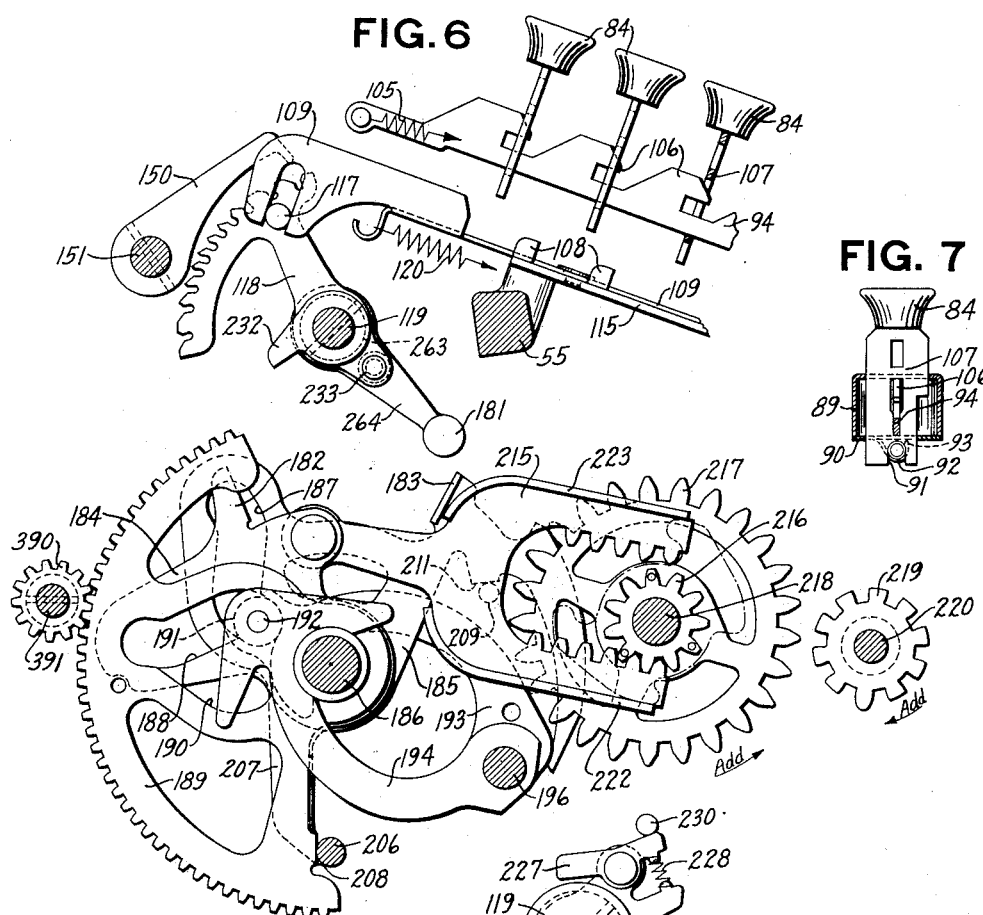
Fig. 6 is a left side elevation of the differential mechanism for the ten dollar amount bank.
Figure 7:
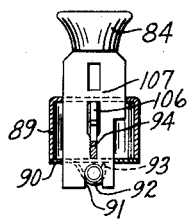
Fig. 7 is a sectional view through an amount bank.

Upon operation of the machine, initial movement clockwise of the main shaft 78 and the arm 154 lifts the link 156 to rock the arm 157 counter-clockwise, causing the pawl 158, in cooperation with the ratchet 160, to rotate said ratchet and the disc 165 counter-clockwise in unison with said arm 157. Counter-clockwise rotation of the disc 165 causes one of the notches 166, in cooperation with the roller 167, to rock the arm 168 clockwise. Clockwise movement of the arm 168 causes a roller 174 carried thereby, in cooperation with an angular slot 175 in a crank 176 fast on the shaft 151, to rock said crank and said shaft clockwise, at the beginning of machine operation, to rock the alining pawls 150 from disengaged position, as shown in Fig. 6, into engagement with the proper tooth spaces of the levers 118, as shown in Fig. 8, to retain said levers in said set positions.

The differential control members 118 position the differentials in proportion to the depressed amount keys during initial movement of the main shaft 78, as will be described later, and while said differentials are being positioned, the periphery of the disc 165, in cooperation with the roller 167, retains the aliners 150 in engagement with the levers 118. After the differentials have been positioned, and near the end of the initial movement clockwise of the shaft 78, continued rotation of the disc 165 moves the next notch 166 opposite the roller 167, whereupon the spring 173 returns the arm 168, the crank 176 and the shaft 151 counter-clockwise to normal position, as shown in Fig. 2, to disengage the aliners 150 from the control levers 118.

A stationary stud 177 (Fig. 2) in the frame 51 extends through a clearance slot 178 in the link 156 and supports a washer and a cotter key, which holds the link 156 in engagement with the stud 155 and the stud in the arm 157.

Return movement counter-clockwise of the shaft 78 and the arm 154, causes the pawl 158 to ratchet over the next succeeding tooth 159 in the ratchet 160, in preparation for the next operation of the machine. From the foregoing description it is apparent that during each operation of the machine the disc 165 is rotated 90 degrees, or one-fourth revolution, counter-clockwise.

Amount differential mechanism

Figure 16:
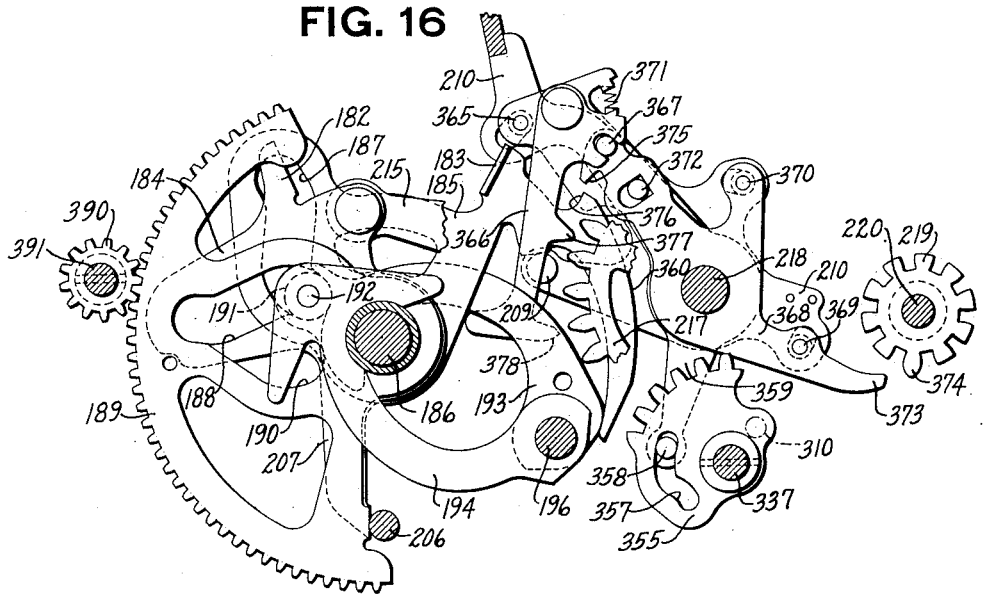
Fig. 16 is a detail view, illustrating the mechanism whereby the totalizer wheels position the differential mechanism in total and sub-total operations.

The differential mechanism associated with the $10.00 amount bank is shown in Figs. 6, 8 and 16, and will now be described. Inasmuch as the differential mechanisms for the different amount banks are substantially alike, it is believed that a description of such mechanism for the $10.00 bank will suffice. The differential mechanism, for the present machine, is similar to that shown in the Shipley Patent No. 2,048,083, referred to at the beginning of this specification, and for that reason will be but briefly described.

The lever 118, for the $10.00 bank, is connected by a hub 263 (Figs. 4 and 6) and a pin 233 to an extension 264 having a rounded end 181 which cooperates with a projection 182 and a bent over ear 183 of complementary movable differential sectors 184 and 185, free on a rod 186 supported by the main frames 50 and 51. When the differential control slide 109 and its lever 118, for the $10.00 bank, are in neutral positions, as shown in Fig. 6, the rounded end 181 of the extension 164 is out of the path of the projection 182 and the bent-over ear 183 of the sectors 184 and 185. When no key is depressed the slide 109 and lever 181 move full distance forwardly and clockwise, respectively, which is the zero position of said members. In total recording operations the slide 109 and the lever 118 are retained in neutral position, as shown in Fig. 6, so that the differential mechanism may be positioned by the totalizer wheels.

Figure 17:
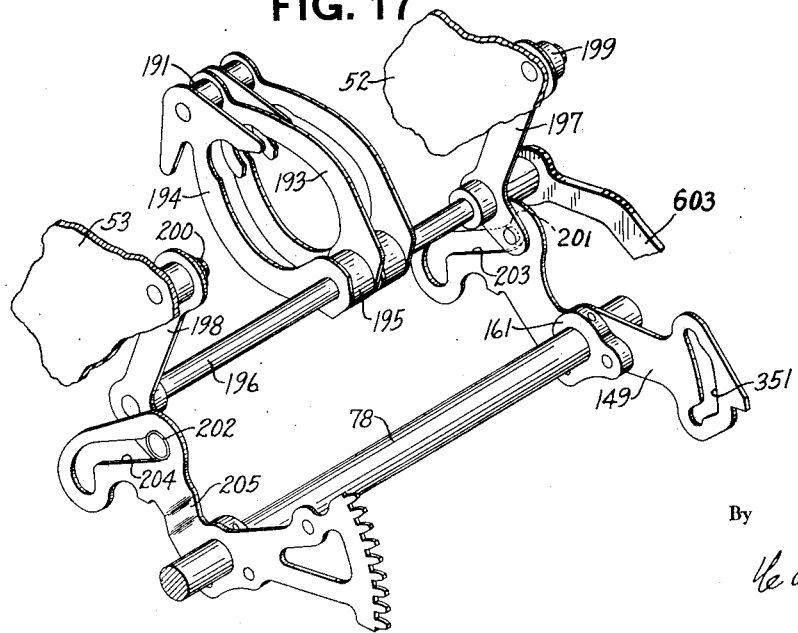
Fig. 17 is a perspective view of the main operating shaft and the mechanism for driving the differential devices.

The sectors 184 and 185 have, respectively, opposed slots 187 and 188, symmetrical in outline and an indicator and type wheel setting segment 189, free on the rod 186, has a heart-shaped slot 190. Through the slots 187, 188 and 190 extends a roller 191 mounted between companion links 193 and 194, which straddle the differential mechanism and are connected by a hub 195 (Fig. 17). The hub 195 is free on a rod 196 secured between arms 197 and 198 fulcrumed, respectively, on studs 199 and 200 secured in the frames 52 and 53. Extensions of the arms 197 and 198 carry, respectively, rollers 201 and 202 which engage, respectively, similar camming slots 203 and 204 in the arm 149 and a similar arm 205 secured on the shaft 78. A rod 206 (Fig. 6), extending between the frames 52 and 53, in cooperation with an extension 207 of the sector 184 and a pad 208 on the segment 189, positions said sector and said segment at the extent of their counter-clockwise movement. A stud 209 (Figs. 6 and 16) in a plate 210, later to be described, in cooperation with a pad 211 on the sector 185, positions said sector at the extent of its clockwise travel. These are the home positions of the sector 184, segment 189 and sector 185.

Assuming that the #7 key has been depressed, in the $10.00 amount bank: Depressing a transaction key 86 causes the control slide 109 and the control lever 118 and its extension 164, to be positioned as shown in Fig. 8. Upon operation of the machine initial movement clockwise of the main shaft 78 (Figs. 6 and 17) causes the cam slots 203 and 204, in cooperation with their respective rollers 201 and 202, to rock the arms 197 and 198 and the rod 196 clockwise, as here viewed. Clockwise movement of the rod 196 shifts the companion links 193 and 194 rearwardly, causing the roller 191, in cooperation with the opposed slots 187 and 188, to move the complementary sectors 184 and 185 toward each other, in scissors fashion, until said sectors embrace the rounded lower end 181 of the lever 118, between the projection 182 and the ear 183. This differentially positions the complementary sectors in proportion to the depressed amount key, and the roller 191, in cooperation with the apex of the heart-shaped slot 190, in the segment 189, positions said segment in proportion to the sectors 184 and 185.

The sector 184 (Figs. 6 and 16) has pivotally connected thereto a Y-shaped member 215, having upper and lower rack teeth adapted to cooperate with a pinion 216 integral with a totalizer actuator gear 217, free on a rod 218 supported by the frames 52 and 53. The actuator gear 217 is adapted to cooperate with a corresponding totalizer wheel 219, for the $10.00 bank, free on a rod 220 supported by a rockable totalizer frame, later to be described.

In adding operations a cam 221 (Fig. 1), free on the shaft 218, in cooperation with parallel bent-over edges 222 and 223 of the member 215 positions said members so that the lower set of teeth is in mesh with the pinion 216. The operation of the cam 221 will be explained later herein, in conjunction with total and sub-total operations. At the beginning of an adding operation the totalizer wheel 219 (Fig. 6) is engaged with the actuator gear 217, whereupon movement of the complementary sector 184 from zero position to its seventh position, as shown in Fig. 8, rotates the actuator gear 217 counter-clockwise and the totalizer wheel 219 clockwise to add therein the amount set up on the keyboard. Near the end of clockwise movement of the shaft 78 and after the amount has been added in the totalizer wheel 219, one of a series of aliners 212 (Fig. 25) fast on the shaft 78 engages the teeth of the actuator 217 to aline said actuator and connected parts in set positions. Near the beginning of return movement counter-clockwise of the shaft 78 the aliner 212 is disengaged from the actuator 217.

After the complementary sectors 184 and 185 have completed their initial movements, to add the amount set up on the keyboard in the totalizer, the totalizer wheel 219 is disengaged from the actuator 217, whereupon return movement counter-clockwise of the main shaft 78 (Fig. 17) and the arms 149 and 205, returns the rod 196 and the companion links 193 and 194 forwardly to return said complementary sectors from the position shown in Fig. 8 to their normal or zero positions, as shown in Fig. 6. When no key is depressed in the $10.00 amount bank the slide 109 and lever 118 move full distance forwardly and clockwise, respectively, to retain the sector 184 in zero position, so that no movement will be imparted to the actuator gear 217 and its associated totalizer wheel 219.

The contour of the opening 190 (Fig. 6) makes the segment 189 and associated parts a minimum movement device, in that the roller 191, upon operation of the machine, moves said segment directly from the position in which it was set during the preceding operation to its new position, said segment 189 remaining in its set position at the end of machine operation. As previously stated, the minimum movement segment 189 positions a front and back indicator and a type wheel for this amount bank to indicate and record the amount set up on the keyboard.

Figure 9:
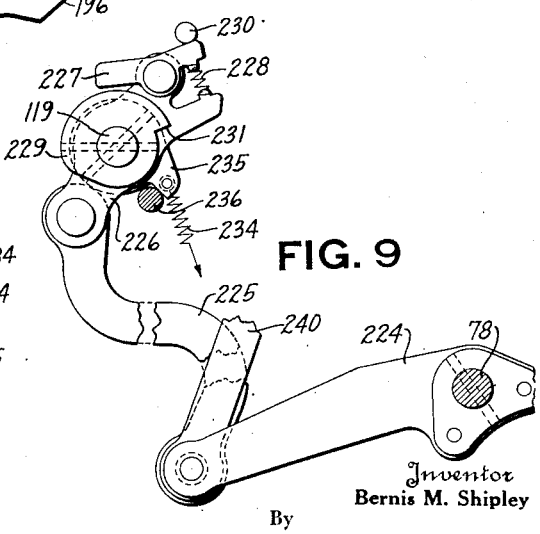
Fig. 9 is a fragmentary detail view of the mechanism that restores the control slides and levers to normal positions.

The control lever 118 and its associated slide 109 are restored to normal position near the end of machine operation by the mechanism shown in Figs. 2 and 9. This mechanism includes an arm 224 secured on the main shaft 78 and connected by a link 225 to an arm 226 free on the shaft 119. The arm 226 has pivotally mounted thereon a pawl 227 urged counter-clockwise by a spring 228 toward a disc 229 fast on the shaft 119. When the machine is at rest a stationary stud 230 retains the pawl 227 out of engagement with the periphery of the disc 229.

Upon operation of the machine initial movement clockwise of the main shaft 78 and the arm 224 rocks the arm 226 also clockwise to retract the pawl 227 from the stud 230 to permit said pawl to engage the periphery of the disc 229. Continued movement clockwise of the arm 226 causes the pawl 227 to snap behind a shoulder 231 of the disc 229, whereupon counter-clockwise return movement of the shaft 78, the arms 224 and 226, rocks the disc 229, the shaft 119, and a finger 232 (Fig. 6), secured on said shaft adjacent the lever 118, counter-clockwise. Counter-clockwise movement of the shaft 119 causes the finger 232, in cooperation with an extension of the stud 233, to return said lever and the control slide 109 counter-clockwise and rearwardly, respectively, to neutral position, as here shown. This, of course, occurs after the aliner 150 has been disengaged from the alining teeth of the lever 118. When the slide 109 is fully returned to neutral position, the bail 121 (Fig. 10) is returned into the path thereof, by spring 133 in the manner hereinafter described, to hold said slide and the lever 118 in neutral positions.

After the bail 121 has been returned to effective position the stud 230 (Fig. 9) rocks the pawl 227 out of engagement with the shoulder 231, thereby freeing the shaft 119 to the action of a spring 234, one end of which is connected to a finger 235 secured on said shaft. The spring 234 immediately returns the shaft 119 clockwise to normal position, which is determined by the finger 235 contacting a stationary stud 236.

Key release mechanism

When the key lock shaft 101 (Fig. 10) is rocked clockwise, upon depression of a transaction key 86, as explained earlier herein, such movement of said shaft is terminated by a stud 237 (Fig. 13) in an arm 238, secured to said shaft, coming in contact with a surface 239 of the frame 53. The arm 224 (Figs. 2, 9 and 13) has pivoted thereto the lower end of a link 240, the upper end of which is slotted to receive a stud 241 of one arm of a bell crank 242 fulcrumed on a stud 243 in the frame 53. Another arm of the bell crank 242 has pivotally connected thereto one end of a pitman 244, the other end of which is slotted to straddle a stud 245 in the frame 53. The pitman 244 has pivoted thereon a three-armed pawl 246, urged counter-clockwise by a spring 247. When the machine is at rest and the parts are in normal position, as shown in Fig. 13, a stud 248 in the frame 53, in cooperation with the downwardly extending arm of the pawl 246, retains a projection 249 of said pawl out of the path of the stud 237.

Initial movement clockwise of the shaft 78, the arm 224 and the bell crank 242, shifts the pitman 244 rearwardly to retract the lower arm of the pawl 246 from the stud 248 and to cause the projection 249 of said pawl, under influence of the spring 247, to by-pass the stud 237. Counter-clockwise movement of the pawl 246 is terminated by a shoulder thereon engaging a stud 250 in the pitman 244. Return movement counter-clockwise of the shaft 78 shifts the pitman 244 forwardly causing the projection 249 of the pawl 246, in cooperation with a flat surface 251 of the stud 237, to rock the arm 238 and the shaft 101 counter-clockwise, as viewed in Figs. 10 and 13. Counter-clockwise movement of the shaft 101 and the rod 102, which it will be recalled is connected to said shaft, (Figs. 1, 6, 10 and 11) rocks the arms 100 for the amount detents 94 counter-clockwise to shift said detents rearwardly to disengage the hooks 106 thereof from the bridges 107, of the depressed amount keys, to permit said amount keys to be spring-returned to undepressed positions.

Counter-clockwise movement of the rod 102 also rocks the yoke 124 (Fig. 11) counter-clockwise to shift the detent 122, for the transaction bank, rearwardly to release the depressed transaction key. Counter-clockwise movement of the arm 103 (Fig. 10) and the yoke 124 (Fig. 11) rocks the projections 139 and 140 thereof beyond the surface 138 of the arm 131 to permit the spring 133 to return said arm, and the bail 121, counter-clockwise and clockwise, respectively, to move said bail into the path of the slides 109 and 134 for the amount and transaction banks, respectively, to retain said slides in neutral position. After the surface 138 on the arm 131 is moved into the path of the projections 139 and 140, the downwardly extending arm of the pawl 246 (Fig. 13) engages the stud 248, and rocks said pawl clockwise to move the projection 249 thereof out of the path of the stud 237, whereupon the springs 105, for the locking detents (Figs. 1 and 6) return said detents forwardly a slight distance, so that the hooks 106 will be in the path of the bridges of the amount keys. Return movement of the yoke 124 (Figs. 10 and 11) to normal position, as here shown, permits the spring 144 to return the arm 146 into the path of the shoulder 148 of the arm 149 to lock the machine against operation.

Totalizer

As previously stated, the wheels 219 of the totalizer (Figs. 1, 4, 25 and 27) are mounted on the rod 220 supported by plates 252 and 253, which together with the shaft 220, and various other shafts and rods of the totalizer mechanism, constitute a rockable frame, rotatably supported by a shaft 254 journaled in the frames 52 and 53. The plate 253 (Fig. 25) carries a stud 255, which cooperates with a pad 256 on a cam lever 257 secured on the shaft 254. A stud 258 in the plate 252 cooperates with the upper end of an arm 259 also secured on the shaft 254.

In adding operations a latch 265, mounted on the plate 253, is impelled by a spring 266 into engagement with a stud 267 in the upper end of the lever 257 and holds said lever in fixed relation to said plate 253. The lever 257 (Fig. 25) carries rollers 268 and 269 which cooperate, respectively, with the peripheries of companion plate cams 270 and 271 (see also Fig. 26), which together with an operating disc 272 and a retaining disc 273 are assembled in an integral unit free on a stud 274 secured in the frame 53. The operating disc 272 has two diametrically opposed operating notches 275, which cooperate with the tooth of a spring-pushed operating pawl 276 pivotally mounted on a plate 277 free on the stud 274. Integral with the plate 277 is a pinion 278, which meshes with teeth in a segmental portion of the arm 205.

Initial movement of the shaft 78 and the arm 205, during machine operation, rotates the pinion 278 and the plate 277 one-half revolution counter-clockwise, causing the pawl 276, which normally engages one of the notches 275, to rotate the assembly, including the cams 270 and 271, one-half revolution in a counter-clockwise direction. Initial movement of the cams 270 and 271 rocks the lever 257, the shaft 254 and arm 259 counter-clockwise, which by means of the studs 255 and 258 rocks the totalizer frame counter-clockwise in unison therewith to engage the wheels 219 of the totalizer with their respective actuators 217, near the beginning of machine operation, after which operation of the differential mechanism pictured in Fig. 6 and explained earlier herein, rotates the actuators 217 and the totalizer wheels 219 to add into said totalizer wheels the amount set up on the keyboard.

Prior to the end of the clockwise movement of the shaft 78 and the cam 205, the cams 270 and 271 rock the lever 257, the shaft 254 and the arm 259 clockwise to normal positions, as shown in Fig. 25, and as the latch 265 remains in engagement with the stud 267 in adding operations, the totalizer frame moves in unison with the lever 257 to disengage the totalizer wheels 219 from the actuators 217. Return movement counter-clockwise of the shaft 78 and the arm 205 rotates the plate 277 clockwise to cause the pawl 276 to ride out of the left-hand notch 275 (Fig. 26) in the disc 272, and to engage the right-hand notch 275 in said disc.

One of two diametrically opposed notches 279 in the retaining disc 273, in cooperation with the tooth of a spring-pulled retaining pawl 280 free on a stud 281 in the frame 53, retains the cam assembly against retrograde movement when the operating pawl 276 is being backed up.

From the foregoing explanation it is evident that the assembly, including the cams 270 and 271, is rotated one-half revolution or 180 degrees counter-clockwise during each machine operation and during this half-revolution symmetrical halves of said cams 270 and 271 rock the lever 257 and the totalizer frame first counter-clockwise and back to normal position.

The manner in which the latch 265 (Fig. 25) controls the disengaging of the totalizer in sub-total operations will be explained later herein.

*Totalizer transfer mechanism*

A brief description will now be given of the totalizer transfer mechanism, shown principally in Figs. 27, 28 and 29. For a more thorough description of this mechanism reference may be had to the Shipley patents referred to at the beginning of this specification.

The totalizer wheel 219 (Fig. 27), for the ten dollar amount bank, meshes with a gear 282 free on a rod 283 supported by the plates 252 and 253 of the totalizer frame (Fig. 4). A retaining pawl 284 free on a rod 285, supported by the plates of the totalizer framework, is urged clockwise by a spring 286 into engagement with the teeth of the gear 282, to retain said gear and its associated totalizer wheel 219 against unintentional displacement. The bail of a yoke 287, supported by the rod 285 and a rod 288 extending between the totalizer side plates, is slotted to receive each of the pawls 284 to retain said pawls in lateral alinement with their respective gears 282.

Integral with the gear 282 is a ratchet 289, the teeth of which cooperate with the upper end of a transfer pawl 290 pivotally connected, at its lower end, to an arm 291 free on a rod 300 extending between the plates 252 and 253 (Fig. 4). The upper end of the transfer pawl 290 is guided in relation to the teeth of the ratchet 289 by a curved slot, in said pawl, in cooperation with a stud 293 in a transfer control lever 294, (Figs. 27 and 28) free on a rod 295 supported by the plates 252 and 253. A spring 296, stretched between the lever 294 and a transfer latch 299, urges said lever counter-clockwise to normally maintain a shoulder 297, formed in an opening in said lever, in contact with a flat surface on a stud 298 carried by the transfer latch 299. The latch 299 is free on the rod 300 supported by the plates 252 and 253, and the spring 296 urges said latch counter-clockwise to normally maintain the stud 298 in engagement with the shoulder 297.

As previously explained, the actuators 217 rotate the totalizer wheels 219 in a clockwise direction (Fig. 27) in adding operations, and when the wheel 219 for the one dollar order passes through zero the long tooth 374 thereon engages the tooth 301 of a trip pawl 302 and rocks said trip pawl counter-clockwise on its pivot rod 303, supported by the plates 252 and 253. Counter-clockwise movement of the trip pawl 302 causes a stud 304 carried thereby, in cooperation with an irregular slot in the latch 299, to rock said latch clockwise, against the action of the spring 296, to move the stud 298 out of engagement with the shoulder 297. This releases the transfer lever 294 to the action of the spring 296, which rocks said lever counter-clockwise, causing the stud 293, to rock the upper end of the transfer pawl 290 into the path of the teeth of the ratchet 289.

Initial movement clockwise of the main shaft 78 (Fig. 29) rocks a plurality of spirally arranged transfer fingers 305 (see also Figs. 22 and 27) clockwise causing the transfer finger for the ten dollar order to by-pass a tappet 306. The tappet 306 is pivotally mounted on a transfer drive arm 307. A spring 308, tensioned between said drive arm and said tappet, urges the tappet clockwise to normally maintain an extension thereof in contact with a stud 309 in the arm 307. The arm 307 is free on a rod 315 extending between the plates 252 and 253 and a spring 316 urges said arm counter-clockwise to normally maintain a projecting surface thereof in contact with a rod 317, extending between the plates 252 and 253.

Return movement counter-clockwise of the shaft 78 and the fingers 305, causes the fingers for the ten dollar order, in cooperation with the angular nose of the tappet 306, to rock the arm 307 clockwise. Clockwise movement of the arm 307, by means of the bifurcated upper end thereof, in cooperation with a stud 318 in the arm 291, rocks said arm counter-clockwise. Counter-clockwise movement of the arm 291 shifts the transfer pawl 290 upwardly, and said pawl, guided by the curved slot therein in cooperation with the stud 293, engages a tooth of the ratchet 289 to rotate the gear 282 and its associated totalizer wheel 219, for the ten dollar order, counter-clockwise and clockwise, respectively one tooth space to add one therein, which is equivalent to transferring ten from the one dollar order.

When the transfer pawl 290 rotates the gear 282 counter-clockwise, the tooth of the ratchet 289, following the one engaged by said transfer pawl, in cooperation with a flat surface on said transfer pawl, rocks said pawl clockwise, which by means of the curved slot therein, in cooperation with the stud 293, also rocks the control lever 294 clockwise, whereupon the stud 298 re-engages the shoulder 297 to restore the transfer mechanism to untripped position. Counter-clockwise movement of the transfer fingers 305 always shifts the transfer pawls 290 forwardly in the manner explained above. However, when the lever 294 is retained in untripped position, as shown in Fig. 28, the stud 293, in cooperation with the slot in the transfer pawl 290, guides the tooth of said pawl below the teeth of the ratchet 289, and consequently no movement is imparted to the gear 282 and its associated totalizer wheel.

The fingers 305 (Figs. 1, 22, 27 and 29) are free on the main shaft 78, and inasmuch as said shaft does not have sufficient oscillating movement to properly operate said fingers, a return gearing, which connects the main shaft to the fingers, is provided for amplifying the movement of said shaft.

Notched downward extensions of the figures 305 fit in matched slots in the bail of a yoke 319 free on the shaft 78, and having integral therewith a gear sector 320 meshing with a corresponding sector 321 free on a stud 322 in the frame 53. Fixed to the sector 321 is a sector 323, which meshes with a companion sector 324 secured to the main shaft 78. The oscillating movement of the main shaft 78, through the sectors 324, 323, 321 and 320 is amplified and imparts sufficient movement to the yoke 319 and the fingers 305 to operate the transfer mechanism properly. The helical arrangement of the fingers 305 (Fig. 29) permits uniform progressive transferring movement from the lowest to the highest denomination without imparting excessive strain to the operating mechanism.

The transfer mechanism described above, in connection with the ten dollar amount bank, is substantially duplicated in every amount bank except the lowest order bank, where it is unnecessary as no amounts are transferred into the lowest order.

Totalizer controlling mechanism

The functions of the machine, namely, adding, total and sub-total, are controlled by a total control lever 325 (Figs. 10 and 25) which is normally in adding position, as here shown, but may be moved either to total or sub-total position. When the total control lever 325 is in adding position the machine functions in the manner explained herein before. Moving the total control lever to either total or sub-total position locks the transaction keys 86 against depression, moves the blocking arm 146 to ineffective position, so that the machine may be operated, and renders mechanism effective that causes the wheels 219 of the totalizer to be rotated reversely to adding direction until the long teeth thereon stop said wheels at zero to position the differential mechanism in proportion to the amount stored in said totalizer wheels. The differential mechanism in turn positions the indicators and the type wheels to indicate and record the amount stored in the totalizer wheels.

In total operations the wheels of the totalizer are disengaged from the actuators 217 while said wheels are standing at zero, and consequently they remain in a zeroized condition. In sub-total operations the totalizer wheels remain in engagement with the actuators 217, during the last half cycle of operation, and are returned thereby to their original positions, to preserve the amount of the sub-total.

The total control lever 325 (Fig. 10) is fulcrumed on a stud 326 in the frame 50, and opposed arms of said lever carry studs 327 and 328 which cooperate respectively with similar J-shaped notches 329 and 330 in the upper edge of a total control plate 331. The plate 331 is slidably mounted by means of parallel slots therein in cooperation with studs 332 in the frame 50. A forward extension of the plate 331 carries a stud 333 which is yieldingly engaged by an inclined top surface of a connecting link 334 fulcrumed on a stud 335 in an arm 336 secured on a rack control shaft 337 journaled in the frames 52 and 53. A spring 338 urges the link 334 counter-clockwise to normally maintain said link in contact with a stop stud 339 in the frame 50. Moreover the link 334 urges the plate 331 upwardly to normally maintain the total control lever 325 in its central or adding position, as here shown.

Moving the total control lever 325 forwardly to total position, or rearwardly to sub-total position, by means of the studs 327 or 328, in cooperation with their respective notches 329 or 330, shifts the plate 331 downwardly against the action of the spring 338. Downward movement of the plate 331 (Fig. 10) moves a shoulder 340 thereon beyond the tooth of a retaining pawl 341 free on a stud 342 in the frame 50, permitting a spring 343 to urge said pawl clockwise into the path of the shoulder 340 to retain the plate 331 in its downward position. When the lever 325 is in either total or sub-total position the stud 327 or 328 moves into the locking portion of the notch 329 or 330 and as the pawl 341 retains the plate 331 in its downward position the total control lever 325 is locked in moved or set position. Near the end of machine operation the latch 341 is rocked out of engagement with the shoulder 340, in a manner later to be described, to release the plate 331 to the action of the spring 338, which immediately returns said plate upwardly to restore the total control lever 325 to its central or adding position.

Downward movement of the plate 331, when the total control lever 325 is moved to total or sub-total position, by means of the stud 333 in cooperation with a hook-shaped extension of a lever 344, free on the stud 143, rocks said lever counter-clockwise. Counter-clockwise movement of the lever 344 moves a bent-over ear 345 on a forward extension thereof into the path of a projection 346 (Figs. 10 and 12) of the yoke 121, to obstruct counter-clockwise releasing movement of said yoke, which in turn obstructs rearward movement of the control plate 126, thereby preventing depression of the transaction keys 86.

In total and sub-total operations it is unnecessary to lock the amount keys 84 (Fig. 6) against depression, as the bail of the yoke 121 retains the control slides 109 and their associated control levers 118 in neutral position, as here shown, therefore depressed amount keys have no effect whatever upon the positioning of the differential mechanism. Retaining the slides 109 and levers 118 in neutral position holds the rounded noses 181, on said levers, out of the path of the projections 182 and the ears 183 so that the differential mechanism may be positioned by the totalizer wheels. Likewise, the bail of the yoke 121 (Fig. 10) retains the control slide 134 for the transaction bank in neutral position, so that the shiftable column printing type wheels (hereinafter described) will print the total in a certain column of the record material.

Counter-clockwise movement of the lever 344 (Fig. 10), upon movement of the total lever 325 to total or sub-total position, causes a stud 347 carried thereby to rock the lever 142 counter-clockwise to move the upper end of the arm 146 out of the path of the shoulder 148 on the arm 149, to unlock the machine for operation.

Free on a stud 348 (Fig. 10), in the frame 50, is an arm 349 carrying a stud 350, which extends within a camming slot 351 in the arm 149. The upper end of the arm 349 carries a stud 352, which cooperates with an L-shaped slot 353 in the link 334.

When the total control lever 325 is in adding position, the stud 352 is in alinement with the horizontal branch of the slot 353. Consequently, during adding operations, the arm 349 moves back and forth idly without imparting any movement to the link 334 and the shaft 337. Moving the total control lever to either total or sub-total position rocks the link 334 downwardly to engage the vertical branch of the slot 353 with the stud 352. Initial movement clockwise of the shaft 78 and the arm 149 causes the camming surface of a tappet 354, mounted on the arm 149 and projecting into the slot 351, in cooperation with the stud 350, to rock the arm 349 clockwise, which by means of the link 334 rocks the arm 336 and shaft 337 also clockwise. Clockwise movement of the shaft 337 (Fig. 1) causes a gear sector 355, for the ten dollar order, secured thereon, in cooperation with a corresponding gear sector 356, secured to the cam 221, to rock said sector and said cam counter-clockwise, which in turn rocks the rack 215 (see also Fig. 25) clockwise to disengage the lower set of teeth thereof from the pinion 216 and to engage the upper set of teeth with said pinion. There is a sector similar to the sector 355 for each amount bank.

The racks 215 and associated actuators 217, for the three overflow banks, are inoperative during adding operations. At such times studs 310, shown in dot and dash lines Fig. 16, in the sectors 355 for the overflow banks, engage the teeth of the actuators 217, for said overflow banks, to retain said racks and said actuators against movement.

In total and sub-total operations, clockwise movement of the sectors 355 moves the studs 310 out of engagement with the actuators, for the overflow banks, to permit movement thereof.

Clockwise movement of the sector 355 (Fig. 16) by means of a cam slot 357 therein, in cooperation with a stud 358 in an arm of a lever 359, rocks said lever counter-clockwise about the rod 218 upon which it is pivoted. The lever 359 is mounted adjacent the stationary plate 210 and a stud 365 in said lever, in cooperation with a concentric slot in said plate, maintains said lever in proper relationship to said plate. Pivotally mounted on the upper end of the lever 359 is a locking pawl 366, slotted to embrace a stud 367 in the upper end of a differential stop lever 368, free on the rod 218, and carrying studs 369 and 370 which engage concentric guide slots in the stationary plate 210. A compressible spring 371 urges the pawl 366 and the lever 368 clockwise and counter-clockwise respectively until such movement is terminated by a stud 372 in the lever 359 contacting the right-hand wall of a slot in the lever 368.

Counter-clockwise movement of the lever 359 (Fig. 16) under influence of the slot 357, moves the pawl 366 and the lever 368 in unison therewith to move a finger 373, of said lever, into the path of a long tooth 374 on the totalizer wheel 219 for the ten dollar order. The shifting of the rack 215 and the lever 368 occurs prior to any movement of the companion links 193 and 194. Counter-clockwise movement of the lever 368 (Fig. 16) moves a tooth 375, on the upper end thereof, into the path of a corresponding tooth 376 on an arcuate extension of the sector 185, to latch said sector in neutral position.

Initial movement rearwardly of the companion links 193 and 194, under influence of the mechanism shown in Fig. 17 and explained earlier herein, causes the roller 191, guided by the slot 187 in the sector 185, to rock the sector 184 clockwise, which by means of the rack 215, the upper teeth of which now engage the pinion 216, rotates the actuator gear 217 (Fig. 6) clockwise. Clockwise movement of the actuator 217 rotates the totalizer wheel 219 in a counter-clockwise or reverse direction, from its pre-set position to zero position. When the wheel 219 approaches zero, the long tooth 374 (Fig. 16) engages the finger 373 to rock the lever 368 clockwise to move the tooth 375 out of the path of the tooth 376 and to simultaneously rock the locking pawl 366 counter-clockwise to engage locking teeth 377 and 378 thereof with teeth of the actuator 217, to lock said actuator and the totalizer wheel 219 against further movement.

The locking of the actuator 217, through the rack 215, locks the sector 184 against further movement, whereupon the roller 191, guided by the slot 188, in said sector, rocks the sector 185 counter-clockwise until the roller 191 reaches the apex of said slots 187 and 188. Movement of the sector 185 away from home position moves an arcuate surface 360 thereon opposite the tooth 375. When the long tooth 374 moves beyond the finger 373 the tooth 375 comes to rest on the surface 360 to prevent the pawl 366 from moving out of engagement with the actuator 217 before the sector 185 and segment 189 have reached the extent of their movements. The roller 191 moving into the apex of the heart-shaped opening 190, in the segment 189, positions said segment in proportion to the position of the complementary sectors 184 and 185, which have in turn been positioned in proportion to the amount standing on the totalizer wheel 219. The segment 189 in turn positions corresponding front and back indicators and a corresponding type wheel to indicate and record the amount standing on the totalizer wheel.

In total operations the wheels of the totalizer are engaged with and disengaged from the actuators 217, by the mechanism pictured in Fig. 25 and described earlier herein, in exactly the same time as for adding operations. Therefore, when the companion links 193 and 194 (Fig. 16) approach the limit of their initial movement the wheel 219, for the ten dollar order, is disengaged from the actuator 217, so that return movement of the complementary sectors 184 and 185 will not reenter the amount on said totalizer wheel, thus leaving said totalizer wheel in a zeroized condition.

Near the end of the initial movement clockwise of the arm 149 (Fig. 10), and after the totalizer wheel has been returned to zero and disengaged from its actuator, the upper end of the slot 351, in cooperation with the stud 350, partially returns the arm 349 and the shaft 337 counter-clockwise. This return movement counter-clockwise of the shaft 337 is not sufficient to disengage the upper set of teeth in the rack 215 from the pinion 216 (Fig. 6) but it is sufficient to cause the cam slot 357 (Fig. 16) in the segment 355, in cooperation with the stud 358, to return the lever 359 clockwise to normal position, as here shown, to rock the locking pawl 366 out of engagement with the actuator 217. Return movement of the lever 359, by means of the stud 372, also returns the lever 368 to home position, to move the finger 373 out of the path of the long tooth of the wheel 219, and to move the tooth 375 out of engagement with the surface 360 and out of the path of the tooth 376, so that the complementary sectors 184 and 185 will be free to return to normal positions, as here shown, upon return movement of the shaft 78, arms 149 and 205 (Fig. 17) and the companion links 193 and 194.

Return movement counter-clockwise of the arm 149 (Fig. 10) causes the tappet 354 to by-pass the stud 350, movement of said tappet being controlled by a notch therein, in cooperation with a stud 361 in the arm 149. This prevents the tappet 354 from again rocking the arm 349 and connected mechanism clockwise, which movement is undesirable at this time. Near the end of its counter-clockwise return movement the cam slot 351 in the arm 149, in cooperation with the stud 350, completes the return movement counter-clockwise of the arm 349 and the shaft 337, which movement causes the segment 355 (Fig. 1) in cooperation with its associated segment 356, to return the cam 221 to adding position to disengage the upper set of teeth in the rack 215 (Fig. 6) from the pinion 216 and to reengage the lower set of teeth in said rack with said pinion.

Sub-total mechanism

As previously explained, the only difference between a total and a sub-total operation is, that in sub-total operations the totalizer wheels remain in engagement with the actuators 217 (Fig. 6) during return movement of said actuators, and are consequently restored to their original positions. The mechanism for controlling the disengaging of the totalizer in sub-total operations is shown in Figs. 1 and 25, and will now be described.

Moving the total control lever 325 from add position counter-clockwise to sub-total position causes the stud 328 in cooperation with a camming slot 379 in an arm 380 secured on a shaft 381 journaled in the frames 50 and 53, to rock said arm and said shaft clockwise. Secured on the left-hand end of the shaft 381 is an arm 382, which moves clockwise in unison with said shaft, causing a bent-over ear 383, of said arm, in cooperation with an upturned surface 384 of the latch 265, to rock said latch counter-clockwise out of engagement with the stud 267. Thereafter, initial movement clockwise of the arm 205 causes the totalizer engaging cams to rock the cam lever 257 counter-clockwise, which movement is imparted through the stud 255 to the totalizer frame to engage the totalizer wheels 219 with their respective actuators 217.

Counter-clockwise engaging movement of the totalizer frame causes a shoulder 385 on the latch 265 to move beyond the ear 383, whereupon the latch 265 is spring-returned a sufficient distance clockwise to latch said shoulder 385 behind the ear 383 to latch the totalizer wheels in engagement with their actuators. Return movement clockwise of the lever 257, after the totalizer wheels have been rotated to zero, does not return the totalizer frame therewith as the latch 265 is still disengaged from the stud 267. Therefore the totalizer wheels remain in engagement with their respective actuators and upon return movement of the sector 184 and the rack 215, the upper teeth in said rack, in cooperation with the pinions 216 and the actuators 217, return the totalizer wheels to their original positions to reenter therein the amount of the sub-total.

After the amount of the sub-total has been reentered in the totalizer wheels, the latch 341 (Fig. 10) is rocked out of engagement with the shoulder 340, in a manner hereinafter described, whereupon the total control lever 325 is spring-returned to add position. Return movement of the total control lever from sub-total to add position causes the stud 328 (Fig. 25), in cooperation with the slot 379, to rock the ear 383 out of engagement with the shoulder 385 of the latch 265, whereupon the totalizer frame is immediately spring-returned clockwise to disengage the wheels of the totalizer from the actuators and to cause the latch 265 to reengage the stud 267 of the cam lever 257. The upper portion of the slot 379 (Fig. 25) in the arm 380, is concentric with the pivot point 326 of the total control lever 325. Consequently when said total control lever is moved from add position to total position the stud 328 rides idly in the upper portion of said slot 379 without imparting any movement to the arm 380, shaft 381, and arm 382.

As previously explained, the latch 341 (Fig. 10) in cooperation with the shoulder 340, retains the plate 331 in its downward position during total and sub-total operations, whereupon the notches 329 and 330, in cooperation with their respective studs 327 and 328, lock the total control lever 325 in either total or sub-total position. Near the end of total and sub-total operations the latch 341 is rocked counter-clockwise out of engagement with the shoulder 340, in the following manner, to permit the total control lever to be spring-returned to add position.

Pivotally mounted on the arm 336 (Fig. 10) is a tappet 386, urged clockwise by a spring 387 until a shoulder thereof engages a stop stud 388 in said arm 336. Initial movement clockwise of the arm 336, in total and sub-total operations, causes the tappet 386 to by-pass a foot-shaped extension 389 of the latch 341. The partial return movement counter-clockwise imparted to the arm 349 when the upper end of the slot 351 engages the stud 350 is not sufficient to cause the tappet 386 to disengage the latch 341 from the shoulder 340. Consequently the total control lever remains latched during return movement counter-clockwise of the arm 149. Near the end of return movement counter-clockwise of the arm 149, the slot 351, in cooperation with the stud 350, completes the return movement of the arm 349, whereupon the tappet 386, in cooperation with the foot 389, rocks the latch 341 counter-clockwise, against the action of the spring 343, to disengage said latch from the shoulder 340 to permit the plate 331 and the total control lever 325 to be spring-returned to normal or add position, as here shown. After the latch 341 has been disengaged from the shoulder 340 the tappet 386 moves beyond the foot 389 thereby permitting said latch to be spring-returned into engagement with an inclined surface adjacent the shoulder 340, as shown in Fig. 10, in preparation for the next total or sub-total operation.

The above mechanism, for controlling the differentials in total recording operations, is similar to that disclosed in the Shipley Patent No. 2,048,083.

Positioning of type wheels and indicators

The manner in which the differential mechanism for the ten dollar amount bank positions its corresponding indicators and type wheels will now be described. It will be remembered that the ten dollar amount bank is being used as representative of all the amount banks.

Referring to Figs. 1, 6 and 34, the ten dollar differential segment 189 meshes with a pinion 390 fast on a shaft 391, opposite ends of which are journaled in curved plates 392 and 393 secured respectively to the inside of the main frames 50 and 51. The segment 189 also meshes with a pinion 394 free on a rod 395 supported by the indicator frames 152 and 153. The pinion 394 is connected by a sleeve 396 to a similar pinion 397 which meshes with the teeth of a gear sector 398 (Fig. 1) free on the shaft 151. Teeth of the sector 398 mesh with a sector 399, free on a rod 400 supported by the frames 152 and 153, and said sector 399 meshes with a pinion 401 integral with a ten dollar front roller indicator 402 free on a rod 403 supported by the frames 152 and 153.

Also fast on the shaft 391 (Figs. 1, 4 and 34) is a pinion 404, which drives a segment 405 free on the rod 186, and similar to the segment 189, said segment 405 in turn driving a pinion 406, free on the rod 395 and integral with a similar pinion 407. The pinion 407 meshes with a sector 408, free on the shaft 151, said sector in turn meshing with a sector 409 free on the shaft 400.

The sector 409 meshes with a pinion 415 integral with a back roller indicator 416 for the ten dollar amount bank, free on the rod 403.

When the differential sector 189 (Figs. 6 and 16) is positioned commensurate with the value of the depressed amount key in adding operations, this positioning is transmitted through the gearing just described, and shown diagrammatically in Fig. 34, to the front and back indicators for the ten dollar amount bank. The front and back indicators are visible, respectively, through apertures in shields 417 and 418, secured to the indicator frames 152 and 153, said apertures matching, respectively, apertures 419 and 420 in the cabinet 60.

Indicator alining pawls 421 (Fig. 1) fast on the shaft 172, normally engage the teeth of the pinions 401 and 415 of the ten dollar indicators 402 and 416 to aline said indicators in set positions. At the beginning of machine operation counter-clockwise movement of the disc 165 (Fig. 2) causes one of the four equally spaced camming notches 166 therein, in cooperation with the roller 167 and associated mechanism, to rock the shaft 172 clockwise to disengage the aliners 421 from the indicator pinions to permit said indicators to be set in the manner explained above. After the indicators have been set and near the end of the first half-cycle of machine operation, the next succeeding notch 166 in the disc 165 moves opposite the roller 167, whereupon the spring 173 returns the aliners into engagement with the teeth of the pinions 401 and 415 to aline the indicators.

The type wheel positioning mechanism, for the ten dollar amount bank, comprises a pinion 422 (Figs. 30 and 34) fast on the shaft 391 and meshing with a segment 423 free on the rod 186. The left-hand end of a horizontally shiftable rack 424 is pivotally connected to the segment 423 and a horizontal slot 425, in the forward end of said rack, bears on a roller 426 free on a stud 427 in the frame 53. Upturned teeth of the rack 424 mesh with a pinion 428 integral with a gear 429 free on a stud 430 supported by plates 431 and 432 (Fig. 32), which form a framework for the type wheel driving gears. The plates 431 and 432 are secured in fixed relation to each other by various studs, and the framework formed by said plates is in turn secured to a left printer frame 433, which together with a right printer frame 434 (Fig. 4) forms the framework for the printer mechanism, said frames 433 and 434 being secured respectively to the left frame 51 and the right frame 50.

The gear 429 meshes with the external teeth of an external-internal gear 435, the internal teeth of which are rotatably mounted on the circumference of a disc 436 mounted on the square portion of a stud 437 (Figs. 30 and 32) extending between the frames 431, 432 and 433 (Fig. 32). The internal teeth of the gear 435 mesh with a pinion 438, fast on a square shaft 439 journaled in the plate 432 (Fig. 4) and the frame 434. The type wheels 440 (Figs. 18, 19 and 21), for the four lower orders, are rotatably mounted on a stud 441 fast in a plate 442, which together with a companion plate 443 forms a framework, shiftable transversely of the record material 85 for printing amounts in the various columns of said record material. The plates 442 and 443 are secured in fixed relation to each other by a stud 444 and sleeves 445 and 446, said sleeves slidable, respectively, on rods 447 and 448, supported by the plate 431 and the frame 434 (Fig. 4).

The ten dollar type wheel 440 (Figs. 19 and 21) has gear teeth which mesh with the external teeth of an external-internal gear 449, the internal teeth of which bear on the circumference of a disc 450 fixedly mounted on a square stud 451, supported by the plates 442 and 443. The internal teeth of the gear 449 mesh with a pinion 452, slidably mounted on the square shaft 39 and adapted to be rotated by said shaft. The train of mechanism just described, for driving the ten dollar amount wheel 440, is substantially duplicated for the other three lower order amounts, and it is, therefore, believed unnecessary to further describe this mechanism.

The differential positioning of the ten dollar segment 189 (Fig. 34) is transmitted through the shaft 391 and pinion 422 to the segment 423 (Fig. 30) thence by the rack 424, the pinion 428, gear 429, external-internal gear 435, pinion 438, shaft 439, pinion 452 (Fig. 19) and external-internal gear 449 to the ten dollar type wheel 440.

As previously explained, the three higher order denominations are for increasing the accumulating capacity of the totalizer, and consequently there are no amount banks for these higher orders. Therefore it is unnecessary for the three type wheels for these orders to shift in unison with the type wheels for the four lower orders. However, it is desirable that the type wheels for the higher orders print only in total and sub-total operations, and mechanism has been provided for accomplishing this result.

The type wheels 462 (Figs. 31 and 32) for the three higher orders, are connected by telescoping tubes to corresponding gears 453, rotatably supported on a rod 454 secured in a hub in the left arm of a yoke 455 turnably mounted on the stud 437. The gears 453 mesh with corresponding external-internal gears 456 rotatable on corresponding discs 457 mounted on the square portion of the stud 437, in exactly the same manner as the similar disc 436 for the four lower order denominations. The gears 456 mesh with corresponding gears 458 connected by pinions to corresponding racks 459, similar to the rack 424 (Fig. 30) for the four lower orders, and said racks 459 are in turn connected to corresponding printer segments 460 (Fig. 34), similar to the segment 423 for the ten dollar amount bank. The segments 460 are in turn connected by the pinions and shafts, shown in Fig. 34, to corresponding differential segments 461, similar to the ten dollar segment 189, which has been fully explained earlier herein. Inasmuch as the three higher orders print only in total and sub-total operations it is unnecessary to provide indicators for these orders.

Normally the type wheels 462 (Fig. 31), for the three higher orders, are in non-printing position. However, when the total control lever is moved either to total or sub-total position, and the machine is thereafter operated, a mechanism is actuated which rocks the yoke 455 to move the type wheels into printing position so that the total amount contained in the totalizer will be recorded upon the record material. The left arm of the yoke 455 carries a roller 467, which cooperates with a camming slot 468 in an arm 469 free on a stud 470 in the frame 433 (Fig. 4). The arm 469 (Fig. 31) is connected by a link 471 to an arm 472 fast on the shaft 337.

Referring to Fig. 10, it will be recalled that when the total control lever 325 is moved to total or sub-total position the link 334 is engaged with the stud 352, whereby movement of the arm 349, by the arm 149, causes the shaft 337 to be rocked first clockwise and back to normal position, in the course of a machine operation. Clockwise movement of the shaft 337 and the arm 472 (Fig. 31), by means of the link 471, rocks the arm 469 in unison therewith, causing the cam slot 468, in cooperation with the roller 467, to rock the yoke 455 counter-clockwise to move the type wheels 452, for the three higher orders, from non-printing position, as here shown in full lines, to printing position, as here shown in dot and dash lines. After printing has been effected, counter-clockwise movement of the shaft 337 rocks the yoke 455 and the type wheels 453 clockwise back to non-printing position.

*Column selecting mechanism*

The bank of transaction keys 86 (Figs. 4 and 10) control the positioning of a differential mechanism similar in many respects to the amount differential mechanism. Said differential mechanism in turn controls the positioning of the shiftable framework supporting the four lower order type wheels 440 (Fig. 18) to position said type wheels in relation to the various columns of the record material 85 (Fig. 3) to print the amount set up on the amount keys in the column of said record material corresponding to the depressed transaction key 86.

Depressing any one of the transaction keys 86 (Fig. 10) moves the lower end of the stem thereof into the path of a corresponding upturned projection 473 on the transaction control slide 134, and simultaneously moves the bail 121 out of the path of the lower end of said slide, whereupon said slide is positioned in proportion to the depressed transaction key, in exactly the same manner as described for the amount control slide 109 (Fig. 6). The slide 134 in turn positions a stud 474 (Fig. 20) in the rounded end of a transaction control lever 475, in the path of complementary transaction differential sectors 476 and 477. Upon operation of the machine a roller, supported by companion links 478 and 479 for the transaction differential, in cooperation with opposed slots in the sectors 476 and 477, and in cooperation with a heart-shaped opening in a transaction differential segment 480, positions said sectors and said segment in proportion to the depressed transaction key, in exactly the same manner as the amount differential mechanism shown in Fig. 6 and explained earlier herein.

Teeth of the transaction segment 480 (Figs. 1, 18 and 20) mesh with upturned teeth of a rack 481 mounted to silde horizontally by means of parallel slots therein in cooperation with studs 482 and 483 in an extension of the frame 58. Teeth in a bent-over portion of the rack 481 mesh with a gear sector 484 integral with a column selecting arm 485 fulcrumed on a stud 486 in a forward extension of the frame 58. The forward end of the arm 485 (Figs. 1, 18 and 21) carries a roller 487 which engages a slot 488 in a plate 489 secured to an angle bracket 490 rigid with the plate 443. The plate 443, it will be recalled, forms a part of the shiftable framework for the four lower order amount type wheels 440.

From the foregoing description it is obvious that the differential setting of the segment 480 is transmitted, through the mechanism shown in Figs. 18 and 20, to the shiftable framework supporting the four lower order type wheels, and therefore positions said type wheels to print in a column of the record material 85 (Fig. 3) corresponding to the depressed transaction key. Like the amount differential segment 189 (Fig. 16), the transaction segment 480 (Fig. 20) moves directly from its pre-set position to its new position, and remains in said new position until the succeeding machine operation, thus constituting what is known as a minimum movement differential member. As shown in Fig. 20, the transaction segment 480 was positioned, in the preceding machine operation, by depression of the H transaction key 86 (Fig. 33) and said segment in turn positioned the shiftable frame, carrying the four lower order amount wheels 440, as shown in Fig. 4, to print the amount set up on the amount keys 84 in the H (Fig. 3) column of the record material 85.

It will be noted by referring to Fig. 3 that the N transaction key 86 positions the shiftable type wheels 440 adjacent the three higher order type wheels 452. However, it will be recalled that in adding operations the three higher order type wheels remain in non-printing position, as shown in Fig. 31, and consequently make no imprint upon the record material 85. By referring to Figs. 19 and 21, it will be seen that the construction of the shiftable framework, carrying the four lower order type wheels, permits the pinions 452 and the discs 450 to slide freely upon the square shafts 439, while said shafts are turning said pinions 452 to position the type wheels.

Inasmuch as totals and sub-totals are printed in the N column of the record material 85 (Fig. 3) and inasmuch as no transaction keys are depressed in total and sub-total operations, it is necessary to provide means for shifting the lower order wheels into alinement with the N column in total and sub-total operations.

Downward movement of the plate 331 (Fig. 10), when the total control lever 325 is moved to total or sub-total position, engages the vertical portion of the notch 353, in the link 334, with the stud 352 in the arm 349, whereupon initial movement clockwise of the arm 149 rocks the arm 349 and the shaft 337 clockwise. Clockwise movement of the shaft 337 carries an arm 491, secured thereon, in unison therewith causing a stud 492, in said arm, in cooperation with a slot in the forward end of an arm 493 (Fig. 20), pivoted on a transaction indicator shaft 494, to rock said arm 493 counter-clockwise. Counter-clockwise movement of the arm 493 moves a arcuate surface 497 thereof into the path of a stud 495 in a downward extension 496 of the sector 477, to lock said sector in its home position, as here shown. As no transaction key is depressed in total or sub-total operations the rounded end of the transaction control lever 475 remains out of the path of the upper ends of the differential sectors 477 and 476. Therefore, upon operation of the machine, initial movement rearwardly of the companion links 478 and 479 causes said companion links, guided by the slot in the sector 477, to position the sector 476 and the segment 480 in proportion to the position of said sector 477. This causes the segment 480, in cooperation with the mechanism shown in Fig. 18, to position the slidable framework, supporting the four lower order type wheels, opposite the N column of the record material 85. Inasmuch as the mechanism shown in Fig. 31 and explained earlier herein has moved the higher order type wheels 452 to printing position, functioning of the printing mechanism causes the amount contained in the totalizer to be printed in the N column of the record material.

The segment 480 (Figs. 20 and 34) meshes with a pinion 498 fast on the shaft 494, said shaft being journaled in the plates 392 and 393. Also fast on the shaft 494 is a pinion 499, which meshes with a segment 500, said segment in turn meshing with a pinion 501 free on the rod 395. The pinion 501 has integral therewith a similar pinion 502 connected by segments 503 and 504 to a pinion fast to a transaction indicator 506, free on the rod 403. The indicator 506 has two sets of letters corresponding to the different transaction keys 86 (Fig. 33), one of said sets being visible from the front of the machine and the other being visible from the rear of the machine. Through the train of mechanism just described the segment 480 (Fig. 20) positions the transaction indicator 506 in proportion to the depressed transaction key.

Aliner for type wheels

Alining mechanism is provided for alining the type wheels in set positions and for alining the shiftable framework, supporting the type wheels for the four lower denominations, in columnar position while printing is being effected.

Figure 23:
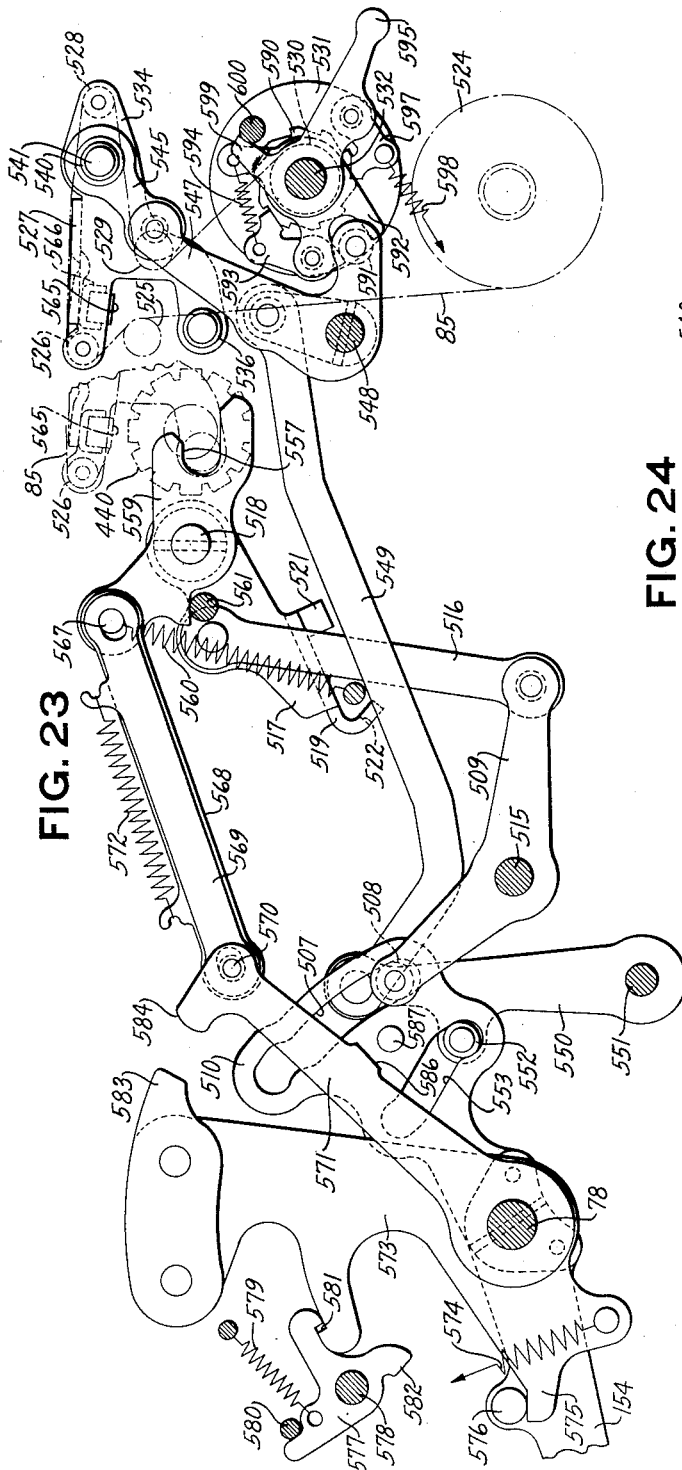
Fig. 23 is a side elevation, as observed from the left, of the impression and paper feeding mechanisms.

Directing attention to Figs. 2 and 23, the arm 154 on the main shaft 78 has secured thereto an arm 510 having a cam slot 507 into which projects a roller 508 on one arm of a bell crank 509 free on a stud 515 in the frame 51. Another arm of the bell crank 509 is connected by a link 516 to an arm 517, free on a shaft 518 journaled in the frames 433 and 434 (Fig. 4). The arm 517 is connected by a bail 519 to a similar arm 520 (Fig. 1) also free on the shaft 518.

After the type wheels have been positioned and after the framework supporting the type wheels for the four lower orders has been moved to a particular columnar position, clockwise movement of the arms 154 and 510, through the cam slot 507, rocks the bell crank 509 clockwise, which movement by means of the link 516, rocks the arm 517, the bail 519, and the arm 520 counter-clockwise. Counter-clockwise movement of the bail 519 causes an alining bar 521, mounted thereon, to engage with the external teeth of the gears 435 and 456 (Figs. 2 and 32) and the gears 449 (Figs. 1 and 21) to aline the type wheels in set positions, while printing is being effected.

A bent over portion of the bail 519 (Figs. 1 and 18) has therein a series of alining notches 522 corresponding to the different columnar positions of the shiftable framework 442 and 443. Counter-clockwise movement of the bail 519 causes a particular one of the notches 522, in cooperation with an alining projection 523 on the bracket 490, to aline the shiftable framework supporting the four lower order type wheels in columnar position while printing is being effected. The imprint is made upon the record material near the end of the clockwise movement of the arms 154 and 510, and return movement counter-clockwise of said arms rocks the bail 519 and the aliner 521 clockwise to ineffective positions as shown in Fig. 23.

Printer mechanism

After the type wheels and the column printer framework have been positioned and alined in the manner explained above, the printer mechanism functions to print the amount in the proper column of the record material.

A record material supply roll 524 (Figs. 1, 2, 4 and 23) is removably mounted between a spring plunger in the frame 434 and a trunnion in the frame 433. The record material 85 is unwound from the supply roll and threaded around a roller 525 (Fig. 23) rotatably supported by a bracket secured to the frame 434 and by an upward extension of the plate 432 (Fig. 2). From the roller 525 the record material 85 is threaded around a roller 526, across a table 527, thence around a roller 528, thence around a roller 529, rotatably supported by brackets 511 and 512 (Fig. 4) secured to the frames 433 and 434 respectively, and finally onto a receiving reel 530 (Fig. 23). The right end of the receiving reel 530 carries a spring plunger which fits into a hole in the frame 434 (Fig. 4) and the left end of said reel is clutched to a disc 531 (Fig. 23) free on a stud 532 in the frame 433. The rollers 526 and 528 (Figs. 1, 4 and 23) are journaled in right and left impression frame plates 533 and 534 connected by the table 527, said arms being similar in outline.

Figure 24:
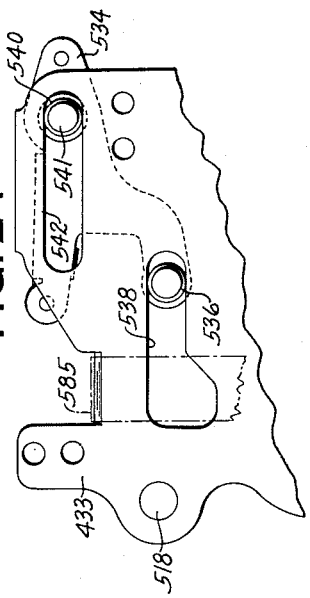
Fig. 24 is a fragmentary view of the left guide plate for the shiftable impression mechanism.

The impression framework comprising the plates 533 and 534 and the table 527, is slidably and rockably mounted between the frames 433 and 434 (Figs. 1, 4 and 24) by means of rollers 535 and 536, on similar extensions of said arms 533 and 534, in cooperation with identical, substantially horizontal, slots 537 and 538 in the frames 434 and 433, respectively, and by means of flanged rollers 539 and 540, mounted on opposite ends of a rod 541 supported by the arms 533 and 534, said rollers cooperating with identical horizontal slots 542 in the frames 434 and 433. Collars 543 (Fig. 4) secured on either end of the rod 541, prevent excessive lateral displacement thereof. Free on the rod 541 (Figs. 4 and 23) are similar links 544 and 545 pivotally connected to similar arms 546 and 547 fast on a shaft 548 journaled in the frames 433 and 434. The arm 547 is connected by a link 549 to a cam arm 550 free on a stud 551 in the frame 51, said arm 550 carrying a roller 552 which engages a cam slot 553 in the arm 510.

Initial movement clockwise of the arms 154 and 510 (Fig. 23), upon operation of the machine, causes the cam slot 553 to rock the cam arm 550 counter-clockwise, which movement, by means of the link 549, is transmitted to the arm 547, shaft 548, and arm 546 (Fig. 4). Counter-clockwise movement of the arms 546 and 547, by means of the cooperating links 544 and 545, shifts the impression framework, comprising the plates 533 and 534 and the table 527, rearwardly to move the rollers 535 and 536 above enlarged portions of the slots 537 and 538 (Figs. 1 and 24) and to simultaneously move said rollers into engagement with corresponding notches 556 and 557 in similar arms 558 and 559 (Figs. 4 and 23) secured on the shaft 518. The shifting of the impression framework causes the rollers 526 and 528 to shift the web of the record material 85 from reading position, on top of the table 527, into inverted printing position above the type wheels 462 and 440, as shown in dot and dash lines in Fig. 23.

The rearward shifting of the impression framework 533 and 534 also moves an impression block 565, contained in an inverted U-shaped bracket 566 (Fig. 23) secured to the bottom of the table 527, to a position directly over the type wheels 462 and 440, as here shown in dot and dash lines. The impression block 565 extends the full width of the record material 85 (Figs. 3 and 4), and consequently will print in any column thereof. A stud 567 (Fig. 23), in an upper extension of the arm 559, engages a hole in the forward end of a toggle link 568 and a clearance slot in the forward end of a companion toggle link 569, while a hole in the rearwardly disposed end of the toggle link 569 engages a stud 570 in an arm 571 free on the shaft 78, and a clearance slot in the companion toggle link 568 likewise engages said stud. A spring 572, tensioned between the companion links 568 and 569, urges said links in opposite directions to form a yieldable connection between the arms 571 and 559.

Free on the main shaft 78 (Figs. 2 and 23) is an impression operating hammer 573 urged clockwise by a spring 574, tensioned between said hammer and the link 156, to normally maintain an extension 575 of the hammer in contact with a stud 576 in the arm 154. Initial movement clockwise of the arm 154 withdraws the stud 576 from the extension 575 whereupon a latch 577, free on a stud 578 in the frame 51 and urged clockwise by a spring 579 into contact with a stop stud 580, also in said frame, in cooperation with a shoulder on an extension 581 of the hammer 573, restrains said hammer against the action of the spring 574. Clockwise movement of the arm 154 moves the link 156 upwardly to tension the spring 574 and causes the stud 576 to engage an extension 582 of the latch 577 to rock said latch out of engagement with the shoulder 581. This releases the hammer 573 to the action of the spring 574, which immediately rocks said hammer clockwise causing a nose 583 thereon, in cooperation with a raised portion 584 of the arm 571, to spread said arm and the toggle links 568 and 569, to impart clockwise movement to the arm 559, shaft 518 and arm 558 (Fig. 4). Clockwise movement of the arms 558 and 559, in cooperation with the rollers 535 and 536, rocks the impression framework 533 and 534 counter-clockwise, the rollers 539 and 540 forming a pivot for said framework, and the rollers 535 and 536 moving downwardly into the enlarged portions of the slots 537 and 538. Downward movement of the impression framework causes the impression block 565 to carry the record material 85 into contact with an inking ribbon 585, and to squeeze the inking ribbon and record material between said impression block 565 and the type wheels 462 and 440 to print the amount in the selected column of the record material.

It will be recalled by referring to Fig. 4 that the three type wheels 462 for the higher order denominations are normally out of printing position and remain out of printing position in adding operations, said wheels functioning only in total operations in conjunction with the four lower order type wheels 440 to print a total.

The yieldable connection formed by the spring 572 (Fig. 23) and the toggle links 568 and 569 causes the impression block 565 to impart uniform pressure along its full length, irrespective of any slight variation in the relation between the column printing type wheels and said impression block, when said type wheels are shifted to various columnar positions. Impression movement of the hammer 573 is terminated by the extension 575 thereof contacting the stud 576, and impression movement of the arm 571 is terminated by a pad 586 thereon contacting a stud 587, in the arm 510, said stud 587 having moved far enough clockwise to permit full movement of said arm 571.

After the imprint has been made, return movement counter-clockwise of the arms 154 and 510 causes the stud 576, in cooperation with the extension 575, to return the hammer 573 in unison therewith, whereupon the latch 577 latches over the shoulder 581, in preparation for the next operation. Return movement counter-clockwise of the arms 154 and 510 also causes the stud 587, in cooperation with the pad 586, to return the arm 571, the toggle links 568 and 569, and associated mechanism, to normal position as shown in Fig. 23. A spring 560 (Fig. 23) assists in returning the last mentioned parts to normal positions, which positions are determined by a shoulder on the arm 559 contacting a stud 561 in the frame 51.

Return movement counter-clockwise of the arm 510 causes the slot 553, in cooperation with the roller 552, to return the arms 550 and 547 clockwise to shift the impression framework 533 and 534 forwardly to move the record material 85 from printing position to reading position where the last entry and several preceding entries are visible through an opening in a closure 588 of the cabinet 60 (Figs. 2 and 3).

The supply and receiving rolls for the record material are accessible through the closure 588 for removing the printed portion of the record material, at the end of a particular business period, or for installing new supply rolls of record material. The opening in the closure 588 has a transparent covering, such as pyralin or glass, through which the last few entries are visible, and the different columns of the record material are identified by letters along the top edge of the opening in the closure 588, said letters corresponding to the various transaction keys 86. The extreme left-hand column of the record material 85 (Fig. 3) is designated as a "Remarks" column, and various information may be autographed in this column through an opening 589 in the transparent cover.

*Paper feeding mechanism*

By referring to Figs. 2, 4 and 23, it will be recalled that the receiving roll 530 for the record material is clutched to the disc 531 and said disc in turn has integral therewith a ratchet 590. Initial movement counter-clockwise of the arm 547, effected in the manner explained above, causes a roller 591, mounted on an extension of said arm, in cooperation with a slot in a plate 592 free on the stud 532, to rock said plate clockwise. The plate 592 has mounted thereon a pawl 593, urged clockwise by a spring 594 into engagement with the teeth of the ratchet 590. It is, therefore, obvious that clockwise movement of the plate 592 causes the pawl 593 to rotate the ratchet 590, the disc 531, and the receiving roll 530 clockwise the equivalent of one tooth space of the ratchet to advance the record material, such advancing of the record material taking place just prior to the impression stroke of the hammer 573. Return movement clockwise of the arm 547 causes the pawl 593 to ratchet into engagement with the succeeding tooth of the ratchet 590, in preparation for the next operation of the machine.

Manual means is also provided for feeding the record material, and such means includes a finger lever 595 (Figs. 2, 4 and 23) which protrudes through an opening 596 in the closure 588. The lever 595 is fulcrumed on the stud 532 and said lever carries a feed pawl 597 urged clockwise by a spring 598 into engagement with the teeth of the ratchet 590, said spring 598 also urging the finger lever 595 clockwise to normally maintain an extension 599 thereof in contact with a stop stud 600 in the frame 433. Moving the lever 595 counter-clockwise, or upwardly, causes the pawl 597 to ratchet into engagement with the succeeding tooth of the ratchet 590, whereupon releasing said lever 595 to the action of the spring 598 causes the receiving roll 530 to be rotated clockwise the equivalent of one tooth of the ratchet to line-space the record material 85.

When the finger lever 595 is being used for advancing the record material the pawl 593, in cooperation with the ratchet 590, acts as a retaining pawl to prevent unintentional retrograde or forward movement of the receiving roll 530, and when the automatic record material feeding mechanism is functioning the pawl 597 functions in a like manner to prevent unintentional movement of the ratchet 590.

The inking ribbon 585 (Figs. 1, 4 and 24) is guided by notches in the frames 433 and 434 over the type wheels 440 and 462 onto reversible spools (not shown.) The ribbon feeding and reversing mechanism is of conventional design, being similar in many respects to the ribbon mechanism used in standard typewriter construction. The ribbon mechanism is driven by an oscillating bell crank 601 (Fig. 1) free on a stud 602 in an extension of the frame 57 and connected by a link 603 (see also Fig. 17) to the shaft 196, from whence said bell crank 601 receives its movement.

As previously explained, the machine rests on the top of a drawer cabinet 604 (Fig. 2) containing a cash drawer 605 normally retained closed by a latch 606, in cooperation with a latch plate 607 secured to a back cross piece of the drawer 605. The latch 606 is fulcrumed at 608 to a depending extension of a bracket 609 secured in a recessed portion of the top of the drawer cabinet 604. A compressible spring 610, extending between a projection of the bracket 609 and a projection on the latch 606, urges said latch clockwise into engagement with the plate 607. An upward extension 615 of the latch 606 projects through an opening in the cabinet top and cooperates with a stud 616 in an arm of a drawer release tappet 617 pivoted at 618 to a release arm 619 fulcrumed on an extension of the frame 58. The tappet 617 is spring urged counter-clockwise into engagement with a stop stud in the arm 619. The arm 619 is connected by a link 620 to the main shaft 78, and upon initial movement of said main shaft, the link 620 rocks said arm 619 counter-clockwise causing the stud 616 to by-pass the upper end of the extension 615. Return movement of the main shaft 78 and the link 620 returns the arm 619 clockwise, whereupon the stud 616 engages the extension 615 and rocks the latch 606 counter-clockwise out of engagement with the plate 607, to free the drawer 605 to the action of its spring, which immediately opens said drawer. Obviously when the drawer is being closed the latch 606 again engages the latch plate 607 to retain said drawer in closed position.

Operation

Inasmuch as the operation of the machine embodying the present invention is comparatively simple, it is believed that a thorough understanding of such operation will have been obtained from a perusal of the foregoing specifications. Nevertheless a brief résumé of machine operation may prove valuable and will now be given.

Referring to Figs. 1 to 4 inclusive, in adding operations the amount of the transaction is set up on the amount keys 84 and the proper transaction key 86 is depressed, this latter freeing the hand lever 61, for manipulation. Manipulation of the lever 61 causes the type wheels 440, for the four lower order denominations, to be shifted to the column of the record material 85 corresponding to the depressed transaction key 86, causes the amount of the transaction to be added into the wheels of the totalizer, and causes the type wheels and the indicators to be positioned in proportion to the amount of the transaction. Manipulation of the hand lever 61 also causes the amount of the adding transaction to be printed in the proper column of the record material 85.

The machine is conditioned for a sub-total recording operation by moving the total control lever 325 (see also Figs. 10 and 25) from add position rearwardly to sub-total position. This locks the transaction keys 86 against depression and causes the differential control levers, which are positioned by the amount keys, to be retained in neutral position. Upon operation of the hand lever 61, the wheels of the totalizer are turned to zero to position the differential mechanism and the type wheels to the amount standing on said totalizer wheels, whereupon functioning of the impression mechanism causes the sub-total to be printed in the proper column of the record material 85. After the sub-total has been printed the wheels of the totalizer are returned from zero to their original positions to reenter the amount of the sub-total therein.

The machine is conditioned for a total recording operation by moving the control lever 325 from its normal or add position forwardly to total position, after which operating the hand lever 61 causes the machine to perform a total recording operation, which is exactly like a sub-total recording operation, excepting that the wheels of the totalizer remain in a cleared or zeroized condition at the end of machine operation.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, the combination of a plurality of amount keys; a plurality of control keys; differentially movable actuators; means to drive the actuators; and means positioned under control of the amount keys and released, upon depression of any one of the control keys, to move into position to control the differential movement of the actuators in proportion to the value of the depressed amount keys.

2. In a machine of the class described, the combination with denominational rows of amount keys, and control keys, of means to record amounts set up on the amount keys; and means positioned under control of the amount keys and released to be immediately positioned upon depression of a control key, to control the recording means to cause the amount set up on the amount keys to be recorded.

3. In a machine of the character described, the combination of amount keys; control keys; elements adapted to be positioned under control of the depressed amount keys; means normally effective to retain the elements in a neutral position; means operated by the control keys to release the retaining means to cause the elements to be positioned in accordance with the depressed amount keys; members connected to and positioned by the elements; and means cooperating with the members to be differentially adjusted in accordance with the position of the members.

4. In a machine of the character described, having differentially movable actuators, the combination of means to drive the actuators; amount keys; slides adapted to be positioned under control of the amount keys; members connected to and positioned by the slides; normally effective means to retain the slides and the members in a neutral position; control keys; means, operated by the control keys, to release the retaining means to cause the slides and the members to be positioned under control of the depressed amount keys, prior to machine operation; and means, effective upon machine operation, to cause the driving means to be positioned under control of the members.

5. In a machine of the class described, the combination of denominational rows of amount keys; control keys; a slide for each row of amount keys, said slides adapted to be positioned under control of said amount keys; a member connected to and positioned by each slide; and means normally effective to retain the slides and the members in a neutral position, said retaining means adapted to be moved to ineffective position by depression of a control key to release the members and slides to move distances determined by the depressed amount keys.

6. In a machine of the character described, the combination of amount keys; control keys; a slide adapted to be positioned under control of the amount keys; a member connected to the slide and adapted to be positioned thereby; differentially movable elements adapted to cooperate with the member; normally effective means to retain the member out of cooperative relationship with the differentially movable elements; means operated by depression of a control key to move the retaining means to ineffective position to release the slide to be positioned by the depressed amount key, whereupon said slide positions the member in the path of the differentially movable elements, prior to machine operation; and means effective during machine operation to drive the differentially movable elements to cause said elements to be positioned by the member, in proportion to the depressed amount key.

7. In a machine of the class described, the combination of amount entering devices, including a slidable member for each denominational order; means, normally effective, to hold the members in a neutral position; control keys, depression of which release the holding means; normally effective means to lock the machine against operation; a total control lever; and means operated by the total control lever to lock the holding means in effective position and to simultaneously move the machine locking means to ineffective position, to condition the machine for a total recording operation.

8. In a machine of the character described, adapted to perform adding and total recording operations, the combination of a control member to condition the machine for adding and total recording operations; amount keys; slides adapted to be positioned by the amount keys; normally effective means to retain the slides in a neutral position; control keys, depression of any one of which moves the retaining means to ineffective position, to cause the slides to be positioned by the depressed amount keys; normally effective means to lock the machine against operation; means, including an element, connecting the locking means to the control keys, whereby depression of said control keys moves the locking means to ineffective position; and means cooperating with the element, when the total control member is moved from adding to total recording position, to move the locking means to ineffective position.

9. In a machine of the class described, the combination of machine operating means including a rock-shaft; a member integral with the rock-shaft; means cooperating with the member to lock the rock-shaft against movement; yieldingly urged means to move the locking means to ineffective position; an element connecting the moving means to the locking means; means normally effective to block movement of the yieldingly urged means; a plurality of control keys; and means whereby depression of any one of the control keys moves the blocking means to ineffective position to cause the locking means to be moved to ineffective position.

10. In a machine of the class described, adapted to perform adding and total recording operations, the combination of amount entering devices, including amount keys and yieldingly urged elements positioned thereby; means normally effective to retain the elements in a neutral position; adding control keys; means operated by depression of any one of the control keys to move the retaining means to ineffective position; a total control lever; and means operated by the total control lever to lock the retaining means against movement by the control keys, to render the amount entering devices ineffective and to prevent depression of the control keys, after the machine has been conditioned for a total recording operation.

11. In a machine of the class described, adapted to perform adding and total recording operations, the combination of amount entering devices, including amount keys and yieldingly urged elements positioned thereby; means normally effective to retain the elements in a neutral position; adding control keys; means operated by depression of any one of the control keys to move the retaining means to ineffective position; machine operating means, comprising a rock-shaft; a member integral with the rock-shaft; means cooperating with the member to lock the shaft against movement; connections between the locking means and the retaining means, whereby movement of said retaining means to ineffective position also causes the locking means to be moved to ineffective position; a total control lever; and means operated by the total control lever to lock the retaining means against movement by the control keys, thereby rendering the amount entering devices ineffective and preventing depression of the control keys, said means also adapted to move the locking means to ineffective position to permit a total recording operation to be performed.

12. In a machine of the class described, the combination of amount entering devices, comprising a plurality of amount keys and yieldingly urged elements positioned thereby; normally effective means to retain the elements in a neutral position; machine operating means, including a rock-shaft; a member integral with the rock-shaft; means cooperating with the member to lock the machine against operation; a lever connected to the locking means; spring-operated means, which in cooperation with the lever is arranged to move the locking means to ineffective position; means to obstruct movement of said spring-operated means, said obstructing means operatively connected to the retaining means; control keys; and means operated by depression of any one of the control keys to move the retaining means to ineffective position, whereupon the elements are positioned by the depressed amount keys and the obstructing means is moved to ineffective position to permit the spring-operated means to move the machine locking means to ineffective position.

13. In a machine of the class described, having a totalizer, the combination of amount keys; members differentially positioned by the amount keys according to the value of the key depressed; differential devices differentially controlled by the members, in adding operations, and differentially controlled by the totalizer in total recording operations; means to condition certain elements of the machine for a total recording operation; and means actuated by the conditioning means to render the members inoperative, whereby the amount keys are rendered ineffective to position the members and the differential devices in total recording operations.

14. In a machine of the class described, having a totalizer, the combination of keys to enter amounts in the totalizer; control keys; differential devices adapted to be positioned by the amount keys, in adding operations, and by the totalizer in total recording operations; connections between the differential devices and the totalizer; members rendered effective by the control keys and differentially positioned under control of the depressed amount keys, to control the differential devices to enter amounts in the totalizer; means to condition the totalizer for a total recording operation; and means actuated by the conditioning means to render the control keys and the members inoperative, whereby the depressed amount keys are rendered ineffective to enter amounts in the totalizer during total recording operations.

15. In a machine of the class described, the combination of amount keys; adding control keys; differential devices; and means rendered effective by depression of any one of the control keys and positioned under control of the depressed amount keys, prior to machine operation, to cause the differential devices to be adjusted in accordance with the value of the depressed amount key, during machine operation.

16. In a machine of the class described, the combination of amount keys; adding control keys; a differential device; a member arranged to be positioned in relation to the differential device by a depressed amount key, said member normally retained in a neutral position but released prior to machine operation by depression of any one of the control keys; and means, effective upon machine operation, to cause the differential device to be positioned by the member commensurate with the value of the depressed key.

17. In a machine of the class described, the combination of a plurality of amount keys; a plurality of control keys; differentially movable actuators; means to drive the actuators; means adjusted under control of the amount keys; means to normally latch the second-named means in a normal position; and means operated by the operation of a control key to withdraw the latch to release the normally latched means for adjustment under control of the amount keys, said normally latched means when so adjusted under control of the amount keys being in position to control the differential movement of the actuators during the machine operation, said movement being commensurate with the value of the amount keys depressed.

18. In a machine of the class described, the combination with denominational rows of amount keys, and control keys, of means to record amounts set up on the amount keys; normally latched means positioned under control of the amount keys when unlatched; means to actuate the second-named means upon release thereof; and means actuated by the depression of a control key to unlatch the normally latched means for adjustment under control of depressed amount keys to control the recording means to cause the amount set up on the amount keys to be recorded.

BERNIS M. SHIPLEY.